(12) United States Patent
Kruse et al.

(10) Patent No.: US 9,332,089 B2
(45) Date of Patent: May 3, 2016

(54) DATA COMMUNICATION COORDINATION WITH SEQUENCE NUMBERS

(71) Applicant: Microsoft Technology Licensing, LLC, Redmond, WA (US)

(72) Inventors: David Kruse, Kirkland, WA (US); Ahmed Mohamed, Sammamish, WA (US); Balan Sethu Raman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/720,083

(22) Filed: May 22, 2015

(65) Prior Publication Data

US 2015/0281404 A1    Oct. 1, 2015

Related U.S. Application Data

(63) Continuation of application No. 14/473,488, filed on Aug. 29, 2014, now Pat. No. 9,071,661, which is a continuation of application No. 13/664,012, filed on Oct. 30, 2012, now Pat. No. 8,850,025, which is a (Continued)

(51) Int. Cl.
*G06F 15/173*    (2006.01)
*H04L 29/06*    (2006.01)
(Continued)

(52) U.S. Cl.
CPC .......... *H04L 67/42* (2013.01); *G06F 17/30194* (2013.01); *H04L 29/08072* (2013.01);
(Continued)

(58) Field of Classification Search
CPC ................................ H04L 47/10; H04L 63/10
USPC .......................................................... 709/226
See application file for complete search history.

(56) References Cited

U.S. PATENT DOCUMENTS

| 4,399,504 A | 8/1983 | Obermarck |
| 4,780,821 A | 10/1988 | Crossley |

(Continued)

FOREIGN PATENT DOCUMENTS

| CN | 1155119 A | 7/1997 |
| CN | 1299484 A | 6/2001 |

(Continued)

OTHER PUBLICATIONS

Aboba et al., Extensible Authentication Protocol (EAP) [online], See Fast Connect, RFC 3748, Jun. 2004, [Retrieved Mar. 3, 2007], Retrieved from: http://www.ietf.org/rfc/rfc3748.txt?number=3748.

(Continued)

*Primary Examiner* — Richard G Keehn
(74) *Attorney, Agent, or Firm* — Danielle Johnston Holmes; Micky Minhas

(57) ABSTRACT

Described are sequence numbers for client-server communication, to control a client's use of server resources. A server grants the client credits, and the client consumes a credit for sending each command to the server. Each credit corresponds to a sequence number, with the set of sequence numbers forming a valid command window. The server enforces that for each received command, the command includes a sequence number that is within the valid command window and that the sequence number has not been used with another command. The server may also maintain a maximum window size, such that clients with credits cannot send a command with a sequence number that beyond a maximum sequence number. When incorporated into a data communication protocol, quality of service, combating denial of service, detection of message loss, division of server resources, secure message signing, and other numerous benefits result.

20 Claims, 13 Drawing Sheets

Related U.S. Application Data continuation of application No. 11/182,989, filed on Jul. 15, 2005, now Pat. No. 8,316,129.

(60) Provisional application No. 60/685,008, filed on May 25, 2005.

(51) Int. Cl.
  *H04L 29/08* (2006.01)
  *G06F 17/30* (2006.01)
  *H04L 12/801* (2013.01)

(52) U.S. Cl.
  CPC ............... *H04L47/10* (2013.01); *H04L 63/10* (2013.01); *H04L 63/123* (2013.01); *H04L 67/06* (2013.01); *H04L 67/1097* (2013.01); *H04L 67/14* (2013.01); *H04L 67/147* (2013.01); *H04L 69/02* (2013.01); *H04L 69/14* (2013.01); *H04L 69/18* (2013.01); *H04L 69/24* (2013.01); *H04L 69/329* (2013.01); *Y02B 60/33* (2013.01)

(56) References Cited

U.S. PATENT DOCUMENTS

| | | |
|---|---|---|
| 4,791,566 A | 12/1988 | Sudama |
| 4,825,354 A | 4/1989 | Agrawal |
| 4,887,204 A | 12/1989 | Johnson |
| 4,891,785 A | 1/1990 | Donohoo |
| 4,914,570 A | 4/1990 | Peacock |
| 5,008,853 A | 4/1991 | Bly |
| 5,109,519 A | 4/1992 | Zimmet |
| 5,113,519 A | 5/1992 | Johnson |
| 5,202,971 A | 4/1993 | Henson |
| 5,218,696 A | 6/1993 | Baird et al. |
| 5,261,051 A | 11/1993 | Masden et al. |
| 5,265,261 A | 11/1993 | Rubin et al. |
| 5,313,646 A | 5/1994 | Hendricks et al. |
| 5,349,642 A | 9/1994 | Kingdon |
| 5,375,207 A | 12/1994 | Blakely et al. |
| 5,410,697 A | 4/1995 | Baird |
| 5,437,013 A | 7/1995 | Rubin et al. |
| 5,452,447 A | 9/1995 | Nelson |
| 5,491,752 A | 2/1996 | Kaufman et al. |
| 5,493,728 A | 2/1996 | Solton |
| 5,513,314 A | 4/1996 | Kandasamy |
| 5,522,042 A | 5/1996 | Fee et al. |
| 5,535,375 A | 7/1996 | Eshel et al. |
| 5,560,008 A | 9/1996 | Johnson et al. |
| 5,588,117 A | 12/1996 | Karp et al. |
| 5,628,005 A | 5/1997 | Hurvig |
| 5,764,887 A | 6/1998 | Kells et al. |
| 5,826,027 A | 10/1998 | Pedersen et al. |
| 5,931,913 A | 8/1999 | Meriwether et al. |
| 5,933,602 A | 8/1999 | Grover |
| 5,978,802 A | 11/1999 | Hurvig |
| 5,987,621 A | 11/1999 | Duso et al. |
| 6,085,247 A | 7/2000 | Parsons et al. |
| 6,092,199 A | 7/2000 | Dutcher |
| 6,125,122 A | 9/2000 | Favichia et al. |
| 6,131,125 A | 10/2000 | Rostoker et al. |
| 6,208,952 B1 | 3/2001 | Goertzel |
| 6,219,799 B1 | 4/2001 | Kandasamy |
| 6,243,862 B1 * | 6/2001 | Lebow .......................... 717/131 |
| 6,247,139 B1 | 6/2001 | Walker et al. |
| 6,275,953 B1 | 8/2001 | Vahalia et al. |
| 6,317,844 B1 | 11/2001 | Kleiman |
| 6,324,581 B1 | 11/2001 | Xu et al. |
| 6,349,250 B1 | 2/2002 | Hart et al. |
| 6,349,350 B1 | 2/2002 | Hathorn et al. |
| 6,401,123 B1 | 6/2002 | Shields et al. |
| 6,430,691 B1 | 8/2002 | Di Santo et al. |
| 6,438,691 B1 | 8/2002 | Mao |
| 6,452,903 B1 | 9/2002 | Peck et al. |
| 6,453,354 B1 | 9/2002 | Jiang et al. |
| 6,640,226 B1 | 10/2003 | Shringeri et al. |
| 6,658,476 B1 | 12/2003 | Van |
| 6,829,473 B2 | 12/2004 | Raman et al. |
| 6,883,015 B1 | 4/2005 | Geen et al. |
| 6,910,082 B1 | 6/2005 | Marcotte |
| 6,928,577 B2 | 8/2005 | Moser et al. |
| 7,020,651 B2 | 3/2006 | Ripley |
| 7,103,007 B2 | 9/2006 | Natarajan et al. |
| 7,111,035 B2 | 9/2006 | McClellan et al. |
| 7,111,060 B2 | 9/2006 | Araujo et al. |
| 7,197,535 B2 | 3/2007 | Salesky et al. |
| 7,243,132 B2 | 7/2007 | Choi |
| 7,290,141 B2 * | 10/2007 | Sengodan et al. ............ 713/168 |
| 7,293,192 B2 | 11/2007 | Allen et al. |
| 7,318,102 B1 * | 1/2008 | Krause et al. ................. 709/230 |
| 7,330,910 B2 * | 2/2008 | Young et al. ...................... 710/5 |
| 7,339,885 B2 | 3/2008 | Ahrens et al. |
| 7,380,080 B2 | 5/2008 | Hughes |
| 7,380,155 B2 | 5/2008 | Fung et al. |
| 7,383,463 B2 | 6/2008 | Hayden et al. |
| 7,386,889 B2 * | 6/2008 | Shay .............................. 726/26 |
| 7,388,866 B2 | 6/2008 | Fan et al. |
| 7,409,420 B2 | 8/2008 | Pullara et al. |
| 7,421,502 B2 * | 9/2008 | Czap et al. .................... 709/229 |
| 7,434,087 B1 | 10/2008 | Singh |
| 7,444,536 B1 | 10/2008 | Jairath |
| 7,451,221 B2 | 11/2008 | Basani et al. |
| 7,453,879 B1 * | 11/2008 | Lo .................................. 370/394 |
| 7,457,722 B1 | 11/2008 | Shain et al. |
| 7,509,407 B2 | 3/2009 | Miller et al. |
| 7,526,658 B1 | 4/2009 | He et al. |
| 7,526,668 B2 | 4/2009 | Shitomi et al. |
| 7,539,722 B2 | 5/2009 | Mohamed et al. |
| 7,562,129 B1 | 7/2009 | Lee et al. |
| 7,664,991 B1 | 2/2010 | Gunda et al. |
| 7,673,066 B2 | 3/2010 | Zheng |
| 7,702,745 B2 | 4/2010 | Lin et al. |
| 8,275,815 B2 | 9/2012 | Aronovich et al. |
| 8,316,129 B2 | 11/2012 | Kruse et al. |
| 8,332,526 B2 | 12/2012 | Kruse et al. |
| 8,631,277 B2 | 1/2014 | Swan et al. |
| 8,788,579 B2 | 7/2014 | Kruse et al. |
| 8,825,885 B2 | 9/2014 | Kruse et al. |
| 8,850,025 B2 | 9/2014 | Kruse et al. |
| 8,856,582 B2 | 10/2014 | George et al. |
| 9,071,661 B2 | 6/2015 | Kruse et al. |
| 2002/0019874 A1 | 2/2002 | Borr |
| 2002/0024963 A1 | 2/2002 | Reeve |
| 2002/0073211 A1 | 6/2002 | Lin et al. |
| 2002/0083130 A1 | 6/2002 | Shimada et al. |
| 2002/0152315 A1 * | 10/2002 | Kagan et al. .................. 709/228 |
| 2002/0161980 A1 * | 10/2002 | Nishikawa .................... 711/162 |
| 2003/0018927 A1 | 1/2003 | Gadir et al. |
| 2003/0056069 A1 * | 3/2003 | Cabrera et al. ............... 711/161 |
| 2003/0058277 A1 * | 3/2003 | Bowman-Amuah .......... 345/765 |
| 2003/0093643 A1 * | 5/2003 | Britt, Jr. ........................ 711/170 |
| 2003/0093678 A1 | 5/2003 | Bowe et al. |
| 2003/0112754 A1 | 6/2003 | Ramani et al. |
| 2003/0115341 A1 * | 6/2003 | Sinha et al. ................... 709/229 |
| 2003/0126195 A1 | 7/2003 | Reynolds et al. |
| 2003/0140129 A1 | 7/2003 | Livnat et al. |
| 2003/0169859 A1 | 9/2003 | Strathmeyer et al. |
| 2003/0182282 A1 | 9/2003 | Ripley |
| 2004/0003210 A1 | 1/2004 | Duale et al. |
| 2004/0003241 A1 | 1/2004 | Sengodan et al. |
| 2004/0018829 A1 * | 1/2004 | Raman et al. ................. 455/406 |
| 2004/0019660 A1 | 1/2004 | E. et al. |
| 2004/0032876 A1 | 2/2004 | Garg et al. |
| 2004/0044930 A1 | 3/2004 | Keller et al. |
| 2004/0103342 A1 * | 5/2004 | Moser et al. ...................... 714/6 |
| 2004/0111527 A1 | 6/2004 | Czap, Jr. et al. |
| 2004/0136325 A1 * | 7/2004 | Dobric et al. ................. 370/241 |
| 2004/0160909 A1 | 8/2004 | Sheynblat |
| 2004/0215794 A1 | 10/2004 | Lauer |
| 2004/0225952 A1 | 11/2004 | Brown et al. |
| 2004/0255202 A1 | 12/2004 | Wong |
| 2004/0260748 A1 | 12/2004 | Springer et al. |
| 2004/0267932 A1 | 12/2004 | Voellm et al. |
| 2004/0268118 A1 | 12/2004 | Bazan Bejarano |

(56) References Cited

U.S. PATENT DOCUMENTS

| | | | |
|---|---|---|---|
| 2005/0010670 A1 | 1/2005 | Greschler et al. | |
| 2005/0015511 A1* | 1/2005 | Izmailov et al. | 709/238 |
| 2005/0015747 A1 | 1/2005 | Zatloukal et al. | |
| 2005/0021832 A1* | 1/2005 | Bennett et al. | 709/235 |
| 2005/0038828 A1 | 2/2005 | Kaluskar et al. | |
| 2005/0041686 A1 | 2/2005 | Roy et al. | |
| 2005/0055345 A1 | 3/2005 | Ripley | |
| 2005/0060442 A1 | 3/2005 | Beverly et al. | |
| 2005/0091212 A1 | 4/2005 | Mohamed et al. | |
| 2005/0102537 A1 | 5/2005 | Zheng | |
| 2005/0111030 A1 | 5/2005 | Berkema et al. | |
| 2005/0114670 A1 | 5/2005 | Bowe et al. | |
| 2005/0125378 A1* | 6/2005 | Kawada | 707/1 |
| 2005/0129045 A1* | 6/2005 | Machulsky et al. | 370/428 |
| 2005/0131832 A1* | 6/2005 | Fransdonk | 705/59 |
| 2005/0132077 A1* | 6/2005 | Biran et al. | 709/230 |
| 2005/0138528 A1 | 6/2005 | Ameigeiras et al. | |
| 2005/0149817 A1* | 7/2005 | Biran et al. | 714/758 |
| 2005/0177635 A1* | 8/2005 | Schmidt et al. | 709/226 |
| 2005/0182850 A1 | 8/2005 | Kohno | |
| 2005/0198113 A1 | 9/2005 | Mohamed et al. | |
| 2005/0198247 A1 | 9/2005 | Perry et al. | |
| 2005/0198359 A1* | 9/2005 | Basani et al. | 709/232 |
| 2005/0198380 A1 | 9/2005 | Panasyuk et al. | |
| 2005/0223014 A1 | 10/2005 | Sharma et al. | |
| 2005/0228884 A1 | 10/2005 | Hawley | |
| 2005/0246803 A1 | 11/2005 | Spencer | |
| 2005/0248803 A1 | 11/2005 | Ohara | |
| 2005/0251448 A1 | 11/2005 | Gropper | |
| 2005/0257022 A1* | 11/2005 | Hughes | 711/172 |
| 2005/0258022 A1 | 11/2005 | Horton et al. | |
| 2005/0262084 A1 | 11/2005 | Tomita | |
| 2005/0262103 A1 | 11/2005 | Stakutis et al. | |
| 2006/0031519 A1* | 2/2006 | Helliwell et al. | 709/227 |
| 2006/0041698 A1 | 2/2006 | Han et al. | |
| 2006/0045005 A1 | 3/2006 | Blackmore et al. | |
| 2006/0047818 A1 | 3/2006 | Kruglick et al. | |
| 2006/0059118 A1 | 3/2006 | Byrd et al. | |
| 2006/0080443 A1 | 4/2006 | Kruglick et al. | |
| 2006/0080568 A1 | 4/2006 | Subbaraman et al. | |
| 2006/0085328 A1* | 4/2006 | Cohen et al. | 705/39 |
| 2006/0095382 A1* | 5/2006 | Mahlbacher | 705/59 |
| 2006/0130107 A1 | 6/2006 | Gonder et al. | |
| 2006/0168262 A1* | 7/2006 | Frazer | 709/230 |
| 2006/0206705 A1* | 9/2006 | Khosravi | 713/151 |
| 2006/0271679 A1 | 11/2006 | Mousseau et al. | |
| 2006/0271692 A1 | 11/2006 | Kruse et al. | |
| 2006/0271697 A1 | 11/2006 | Kruse et al. | |
| 2006/0281525 A1* | 12/2006 | Borissov | 463/20 |
| 2007/0150558 A1 | 6/2007 | Teodosiu et al. | |
| 2007/0171793 A1 | 7/2007 | Mesut et al. | |
| 2007/0192326 A1 | 8/2007 | Angel et al. | |
| 2007/0220155 A1 | 9/2007 | Nalla et al. | |
| 2008/0010485 A1 | 1/2008 | Shitomi et al. | |
| 2008/0126704 A1 | 5/2008 | Ulrich et al. | |
| 2008/0151885 A1 | 6/2008 | Horn et al. | |
| 2008/0172397 A1 | 7/2008 | Maeda et al. | |
| 2009/0077097 A1 | 3/2009 | Lacapra et al. | |
| 2009/0138615 A1 | 5/2009 | Cristallo et al. | |
| 2009/0172085 A1 | 7/2009 | Arthursson | |
| 2009/0222582 A1 | 9/2009 | Josefsberg et al. | |
| 2009/0319661 A1 | 12/2009 | Shiozawa et al. | |
| 2009/0327798 A1 | 12/2009 | D'Amato et al. | |
| 2010/0042715 A1 | 2/2010 | Tham et al. | |
| 2010/0161855 A1 | 6/2010 | Mohamed et al. | |
| 2010/0185704 A1 | 7/2010 | George et al. | |
| 2011/0040826 A1 | 2/2011 | Chadzelek et al. | |
| 2011/0131334 A1 | 6/2011 | Takasu | |
| 2012/0151249 A1 | 6/2012 | Swan et al. | |
| 2013/0007180 A1 | 1/2013 | Talpey et al. | |
| 2013/0007518 A1 | 1/2013 | George et al. | |
| 2013/0066941 A1 | 3/2013 | Kruse et al. | |
| 2013/0067095 A1 | 3/2013 | Kruse et al. | |
| 2013/0091199 A1 | 4/2013 | Kruse et al. | |
| 2013/0097211 A1 | 4/2013 | Kruse et al. | |
| 2013/0304932 A1 | 11/2013 | Kruse et al. | |
| 2014/0372521 A1 | 12/2014 | George et al. | |
| 2015/0026248 A1 | 1/2015 | Kruse et al. | |
| 2015/0365482 A1 | 12/2015 | Kruse et al. | |

FOREIGN PATENT DOCUMENTS

| | | |
|---|---|---|
| CN | 1758608 A | 4/2006 |
| CN | 1767472 A | 5/2006 |
| CN | 1882933 | 12/2006 |
| CN | 1906593 A | 1/2007 |
| CN | 101207635 A | 6/2008 |
| CN | 101217483 A | 7/2008 |
| CN | 101594320 | 12/2009 |
| CN | 101605194 A | 12/2009 |
| CN | 101926155 | 12/2010 |
| EP | 1 259 045 A2 | 11/2002 |
| EP | 1 259 045 A3 | 11/2002 |
| EP | 1643406 A2 | 4/2006 |
| EP | 1 727 056 | 11/2006 |
| EP | 2727287 | 5/2014 |
| JP | 60-019341 | 1/1985 |
| JP | 62-297927 | 12/1987 |
| JP | 63-061148 | 3/1988 |
| JP | 63-205747 | 8/1988 |
| JP | 63-256165 | 10/1988 |
| JP | 64-061148 | 3/1989 |
| JP | 02-101847 | 4/1990 |
| JP | 03-048558 | 3/1991 |
| JP | 03-074745 | 3/1991 |
| JP | 04-172039 | 6/1992 |
| JP | 04-229746 | 8/1992 |
| JP | 05-089048 | 6/1993 |
| JP | 05-143488 | 6/1993 |
| JP | 06-075890 | 3/1994 |
| JP | H10-133971 | 5/1998 |
| JP | 10-313342 | 11/1998 |
| JP | 11-055314 | 2/1999 |
| JP | 2001-094613 | 4/2001 |
| JP | 2003-016766 | 1/2003 |
| JP | 2003-069610 | 3/2003 |
| JP | 2003-281091 | 3/2003 |
| JP | 2003-125022 | 4/2003 |
| JP | 2004-005427 | 1/2004 |
| JP | 2004-229143 | 8/2004 |
| JP | 2005-322016 | 11/2005 |
| JP | 2007-49755 | 2/2007 |
| JP | 3967758 | 6/2007 |
| KR | 10-1994-0001700 | 3/1994 |
| KR | 10-0860152 | 9/2008 |
| WO | WO 03/096646 | 11/2003 |
| WO | WO 03105439 | 12/2003 |

OTHER PUBLICATIONS

Almeida, "FIFS: A Framework for Implementing User-Mode File Systems in Windows NT", Proceedings of the 3rd USENIX Windows NT Symposium, Jul. 12-15, 1999, 19 pgs.

Alvisi et al., "Low-Overhead Protocols for Fault-Tolerant File Sharing"; In Proceedings of the IEEE 18th International Conference on Distributed Computing Systems; 1998; 10 pgs.

ANSI, Financial Institution Message Authentication (Wholesale), Financial Services Technical Publication, ANSI X9.9-1994, Aug. 15, 1986; 38 pgs.

Asokan et al., Server Supported Signatures, Journal of Computer Security, Fall 1997; 13 pgs.

Bell Labs, Plan 9 default Fossil File System [online], [Retrieved Sep. 17, 2007], Retrieved from: http://plan9.bell-labs.com/magic/man2html/4/fossil; 4 pgs.

Bensaou et al., Credit-Based Fair Queueing (CBFQ): A Simple Service-Scheduling Algorithm for Packet-Switched Networks, IEEE/ACM Transactions on Networking, vol. 9, No. 5, Oct. 2001.

Chinese 1st Office Action in Application 201110329007.4, mailed Oct. 10, 2013, 13 pgs.

Chinese 1st Office Action in Application 201110462797.3, mailed Apr. 16, 2014, 11 pgs.

(56) References Cited

OTHER PUBLICATIONS

Chinese 1st Office Action in Application 201210330725.8, mailed Oct. 10, 2014, 11 pgs.
Chinese 1st Office Action in Application 201210331041.X, mailed Sep. 3, 2014, 14 pgs.
Chinese 1st Office Action in Application 201210434813.2, mailed Nov. 3, 2014, 10 pgs.
Chinese 2nd Office Action in Application 201110329007.4, mailed Jun. 12, 2014, 8 pgs.
Chinese 2nd Office Action in Application 201110462797.3, mailed Sep. 24, 2014, 6 pgs.
Chinese 4th Office Action in Application 200510127998.2, mailed Nov. 16, 2011, 7 pgs.
Chinese 5th Office Action in Application 200510127998.2, mailed Mar. 2, 2012, 8 pgs.
Chinese Notice of Allowance in Application 2005101279978.2, mailed Dec. 5, 2011, 4 pgs.
Chinese Notice of Allowance in Application 200510127998.2, mailed Aug. 20, 2012, 4 pgs.
Chinese Notice of Entering into Substantive Examination in Application 201210331041.X, mailed Mar. 6, 2013, 3 pgs.
Chinese Office Action dated Apr. 29, 2010 in Application No. 200510127997.8, 16 pgs.
Chinese Office Action dated Apr. 29, 2010 in Application No. 200510127998.2, 10 pgs.
Chinese Second Office Action dated Mar. 3, 2011 in Application No. 200510127998.2, 8 pgs.
Chinese Second Office Action dated Mar. 30, 2011 in Application No. 200510127997.8, 26 pgs.
Chinese Third Office Action dated Jul. 7, 2011 in Application No. 200510127998.2, 9 pgs.
CIFS http://msdn.microsoft.com/library/en-us/cifs/protocol/cifs.asp?frame=true, obtained online Oct. 23, 2006, 2 pgs.
CIFS Oplock File Locking, MSDN, [Retrieved Jan. 7, 2008], Retrieved from: http://msdn2.microsoft.com/en-us/library/aa302210.aspx; 3 pgs.
Dehaese, G., *The ISO 9660 File System* [online], May 1995, [Retrieved Sep. 14, 2007], Retrieved from: http://users.pandora.be/it3.consultants.bvba/handouts/ISO9960.html.
Digital Equipment Corporation, *Introduction to RSX-11M* [online, Order No. AA-L763B-TC, RSX-11M Version 4.2, First Printing Sep. 1979, Revised Nov. 1981 and Jul. 1985, [Retrieved Aug. 9, 2007], Retrieved from: http://www.computer.museum.uq.edu.au/RSX-11%20Manuals.html; 65 pgs.
Digital Equipment Corporation, *RSX-11M/M-Plus RMS-11 User's Guide* [online], Order No. AA-L669A-TC, Apr. 1983, [Retrieved Aug. 17, 2007], Retrieved from: http://www.computer.museum.uq.edu.au/RSX-11%20Manuals.html; 186 pgs.
ECMA, Volume and File Structure for Write-Once and Rewritable Media using Non-Sequential Recording for Information Interchange 3rd Edition [online], ECMA-167, Jun. 1997, [Retrieved Aug. 9, 2007, Retrieved from: http://www.ecma-international.org/publications/files/ECMA-ST/Ecma-167.pdf; 150 pgs.
European Exam Report in Application 05111885.9 mailed Sep. 13, 2007, 5 pgs.
European Intention to Grant in Application 10013021.0, mailed Jan. 28, 2014, 7 pgs.
European Invitation to Correct Defects in Application No. 08008916.2 mailed Sep. 4, 2008, 6 pgs.
European Notice of Allowance in Application 05111885.9 mailed Jun. 11, 2008, 6 pgs.
European Notice of Allowance in Application 080089162 mailed Jan. 24, 2011, 6 pgs.
European Notice to Grant in Application 05111885.9 mailed Oct. 9, 2008, 1 page.
European Search Report dated Feb. 1, 2011 in Application No. 10013021.0, 9 pgs.
European Search Report dated Feb. 15, 2006 in Application No. 05111729.9, 193 pgs.

European Search Report dated Feb. 22, 2006 in Application No. 05111729.9, 8 pgs.
European Search Report dated Jan. 20, 2006 in Application No. RS113279/US18298905, 2 pgs.
European Search Report dated Jan. 20, 2006 in Application No. RS113280/US18225105, 4 pgs.
European Search Report dated Jan. 4, 2011 in Application No. 10012923.8, 9 pgs.
European Search Report dated Jun. 18, 2008 in Application No. 08008916.2, 9 pgs.
European Search Report dated Sep. 19, 2006 in Application No. 055111885.9, 8 pgs.
French, Steven M., "A New Network File System is Born: Comparison of SMB2, CIFS, and NFS", retrieved Mar. 23, 2011, 14 pgs.
Gifford et al., *The Cedar File System*, Communications of the ACM, vol. 31, No. 3, Mar. 1998; 11 pgs.
Greenberg et al., "NFILE—A File Access Protocol"; Network Working Group; RFC 1037; Dec. 1997; 43 pgs.
Gu et al., "Sabul: A High Performance Data Transfer Protocol"; IEEE Communications Letters; 2001; 11 pgs.
Hartman; "The Zebra Striped Network File System"; Doctoral dissertation at the University of California at Berkeley; 1991; 159 pgs.
Hertel, Implementing CIFS The Common Internet File System [online], [Retrieved Jul. 13, 2007], Retrieved from: http://ubiqx.org/cifs/; 3 pgs.
Hiltunen et al., "Implementing Integrated Fine-Grain Customizable QoS Using Cactus"; The 29th Annual International Symposium on Fault-Tolerant Computing (Fast Abstract); Madison, WI; 1999, 2 pgs.
Hitz et al., File System Design for an NFS File Server Appliance [online], Network Appliance, TR 3002, 1994, [Retrieved Aug. 9, 2007], Retrieved from: http://www.netapp.com/library/tr/3002.pdf; 13 pgs.
Hobbit, CIFS: Common Insecurities Fail Scrutiny [online], Avian Research, Jan. 1997, Retrieved from: http://web.textfiles.com/hacking/cifs.txt; 39 pgs.
Hong Kong Certificate of Grant in Application 07105689.8 mailed Jun. 26, 2009, 2 pgs.
IBM, IBM Personal Computer Seminar Proceedings, vol. 2, No. 5, Sep. 1984; 13 pgs.
Indian First Exam Report in Application 3305/DE/L2005, mailed Mar. 28, 2013, 2 pgs.
International Organization for Standardization, Banking-Approved algorithms for message authentication—, ISO 8731-1, Jun. 1, 1987; 4 pgs.
Japanese Office Action in Application 200510127997.8 mailed Aug. 3, 2011, 8 pgs.
Japanese Office Notice of Allowance in Application 2006-307121 mailed Feb. 14, 2012, 6 pgs.
Japanese Office Notice of Rejection in Application 2006-307121 mailed Aug. 12, 2011, 5 pgs.
Japanese Office Notice of Rejection mailed Apr. 3, 2007 in Application No. 2005-356145, 6 pgs.
Japanese Office Notice of Rejection mailed Jan. 15, 2008 in Application No. 2005-356145, 5 pgs.
Japanese Office Notice of Rejection mailed Mar. 10, 2006 in Application No. 2005-356146, 5 pgs.
Japanese Office Notice of Rejection mailed May 12, 2006 in Application No. 2005-356145, 4 pgs.
Japanese Office Notice of Rejection mailed Nov. 10, 2006 in Application No. 2005-356146, 3 pgs.
John H. Samba Team Terpstra, "Chapter 32. High Availability Part III. Advanced Configuration", retrieved Mar. 22, 2011, 6 pages.
Kent et al., IP Authentication Header [online], RFC 2402, Nov. 1998, [Retrieved Aug. 9, 2007], Retrieved from: http://tools.ietf.org/html/rfc2402, 20 pgs.
Kent et al., Security Architecture for the Internet Protocol [online], RFC 2401, Nov. 1998, [Retrieved Jun. 6, 2007], Retrieved from: http://www.ietf.rg/rfc/rfc2401.txt? number=2401, 62 pgs.
Klima, "Tunnels in Hash Functions: MD5 Collisions Within a Minute", Version 1, Mar. 2006, Version 2 Apr. 2006, Cryptology ePrint Archive, 17 pgs.
Korean Notice of Preliminary Rejection mailed Jan. 21, 2011, Application No. 2007-0080691, 4 pgs.

(56) References Cited

OTHER PUBLICATIONS

Korean Notice of Rejection mailed Nov. 17, 2006 in Application No. 10-2005-0124340, 5 pgs.
Krawczyk, "HMAC: Keyed-Hashing for Message Authentication", RFC-2104, Feb. 1997, http://www.jetf.org/rfc/rfc2104.txt, 10 pgs.
Leach et al., CIFS Logon and Pass Through Authentication Preliminary Draft [online], Jan. 3, 1997, 22 pgs.
Leach et al., CIFS/E Browser Protocol Preliminary Draft [online], Jan. 10, 1997, 33 pgs.
Leach et al., draft-leach-cifs-print-spec-00.txt, CFIS Printing Specification Preliminary Draft [online], Jan. 31, 1997; 30 pgs.
Leach et al., draft-leach-cifs-rap-spec-00.txt, CFIS Remote Administration Protocol Preliminary Draft [online], Feb. 26, 1997; 39 pgs.
Leach, P. et a., "A Common Internet File System (CIFS/1.0) Protocol Preliminary Draft", draft-leach-cifs-v1-spec-02, Mar. 13, 1997, http://microsoft.com/mscorp/ip/protocols/BSTD/CIFS; 160 pgs.
Leach, P., Naik, D., A Common Internet File System (CIFS/1.0) Protocol Preliminary Draft [online], Dec. 19, 1997. Retrieved from: http://tools.ietf.org/html/draft-leach-cifs-v1-spec-01; 132 pgs.
LeGrow, "Maintenance—MSRPC Update (Version 11) and SMB Update (Version 3)"; cfr-users mailing list; http://list.nfr.com/mailman/listingfo/nfr-users; May 20, 2004; 2 pgs.
Linn, "Generic Security Service Application Program Interface, Version 2, Update 1", RFC 2743, Jan. 2000, http://www.ieft.org/rfc/rfc2743.txt, 90 pgs.
Loafman, Zach, "SMB1/SMB2; A BSD Perspective", retrieved Mar. 22, 2011, 35 pgs.
Maiworm, Daniel, "Symantec Enterprise Vault", Retrieved at http://www.cstl.com/products/Symantec/Symantec-Enterprise_Vault/File System Archiving.pdf, Feb. 5, 2007, pp. 35.
Microsoft Computer Dictionary, Microsoft Press, Fifth Edition, 2002, p. 486.
Morris, "Andrew: A Distributed Personal Computing Environment", Communications of the ACM, vol. 29, No. 3, Mar. 1986, New York, 20 pgs.
MS-SMB2-Preview: Server Message Block (SMB) Version 2 Protocol Specification, copyright 2010 Microsoft Corporation, 309 pgs.
Mullender, "A Distributed File Service Based on Optimistic Concurrency Control", Proceedings of the Tenth ACM Symposium on Operating Systems Principles, Dec. 1-4, 1985, Orcas Island, WA, 14 pgs.
Murphy, Origins and Development of TOPS-20 [online], © 1989, 1996, [Retrieved Aug. 9, 2007], Retrieved from: http://www.opost.com/dlm/tenex/hbook.html; 28 pgs.
National Bureau of Standards, *Computer Data Authentication*, Federal Information Processing Standards Publication 113, May 30, 1985; 9 pgs.
New Zealand Examination Report in Application 622122, mailed Aug. 28, 2014, 2 pgs.
NTFS Design Goals and Features, Retrieved at http://wininternals.uw.hu/ch12lev1sec4.html, Retrieved Date: Oct. 11, 2010, pp. 9.
Oehme, et al.,"IBM Scale out File Services: Reinventing network-attached storage", Retrieved at http://www-935.ibm.com/services/us/its/pdf/sofs-am-journal-final-07010B.pdf, vol. 52 No. 4/5 Jul./Sep. 200B, 10 Pages.
Pawlowski, Brian et al. "The NFS Version 4 Protocol", Proceedings of the 2nd International System Administration and Networking Conference (SANE 2000). vol. 2. No. 5. 2000, 20 pgs.
PCT International Search Report and Written Opinion in International Application PCT/US2011/063618, mailed Jun. 28, 2012, 9 pgs.
PCT International Search Report and Written Opinion in International Application PCT/US2012/041049, mailed Jan. 17, 2013, 12 pgs.
PCT International Search Report and Written Opinion in International Application PCT/US2012/041703, mailed Feb. 14, 2013, 13 pgs.
PCT International Search Report and Written Opinion in International Application PCT/US2012/054038, mailed Feb. 20, 2013, 10 pgs.
PCT International Search Report and Written Opinion in International Application PCT/US2012/054039, mailed Feb. 27, 2013, 11 pgs.
Periasamy, Anand Babu, "Next-Gen Linux File Systems: Change Is the New Constant", retrieved Mar. 23, 2011, 4 pages.
Pranevich, "The Wonderful World of Linux 2.6"; 2005; 17 pgs.
Rivest, "The MD5 Message-Digest-Algorithm", RFC 1321, Apr. 1992, http://www.jetf.org/rfc/rfc2104.txt, 19 pgs.
Rubin, F., *Message Authentication Using Quadratic Residues* [online], Jan. 31, 1995, [Retrieved Sep. 14, 2007], Retrieved from: http://www.mastersoftware.biz/crypt002.htm; 6 pgs.
Samba Team, *The Samba Team are pleased to announce Samba1.9.18* [online], Jan. 7, 1998, [Retrieved Jan. 4, 2008], Retrieved from: http://de.samba.org/samba/history/samba1.9.18.html; 4 pgs.
Satran et al. *Internet Small Computer Systems Interface (iSCSI)* [online], RFC 3720, Apr. 2004, [Retrieved Mar. 3, 2007], Retrieved from: http://www.ietf.org/rfc/rfc3720.txt?number=3720; 67 pgs.
Satyanaryanan et al, "Scalable, Secure and Highly Available Distributed File Access", May 1990, 12 pgs.
Schneier, B., *Applied Cryptography Protocols, Algorithm and Source Code in C Second Edition*, John Wiley & Sons, Inc., © 1996; 788 pgs.
Shepler, S. et al., "Network File System (NFS) Version 4 Protocol", Network Working Group, Request for Comments: 3530, Apr. 2003, 275 pgs.
Shepler, S. et al., "NFS Version 4 Protocol", RFC 3010, Proceedings on the 2nd International System Administration and Networking Conference (SANE2000), Dec. 2000, 212 pgs.
Shepler, S., *NFS Version 4 Design Considerations* [online], RFC 2624, Jun. 1999, [Retrieved Jan. 4, 2008], Retrieved from: http://tools.ietf.org/html/rfc2624; 22 pgs.
SMB: The Server Message Block Protocol [online], 1999, Retrieved from: http://ubiqx.org/cifs/SMB.html; 143 pgs.
SNIA, *Common Internet File System (CIFS) Technical Reference* [online], Mar. 1, 2002, Retrieved from: http://www.snia.org/tech_activities/CIFS/CIFS-TR-1p00_FINAL.pdf; 150 pgs.
Soules et al., *Metadata Efficiency in a Comprehensive Versioning File System*, May 2002; 33 pgs.
Srinivasan et al., Spritely NFS: Implementation and Performance of Cache-Consistency Protocols [online], May 1989, [Retrieved Jan. 4, 2008], Retrieved from: http://www.hpl.hp.com/techreports/Compaq-DEC/WRL-89-5.pdf; 35 pgs.
Szczerbina, "Novell's NetWare Core Protocol", Dr. Dobb's Journal, Nov. 1993, 17 pgs.
Talpey et al., "NFSv4 Session Extensions, draft-ietf-nfsv4-sess-01"; Internet Draft; The Internet Society; Feb. 2005; 70 pgs.
The Java CIFS Client Library [online], [Retrieved Jul. 13, 2007], Retrieved from: http://jcifs.samba.org/, 8 pgs.
The Open Group; Technical Standard; Protocols for X/Open PC Interworking: SMB, Version 2; http://www.opengroup.org/onlinepubs/9697999099/toc.pdf; retrieved on Sep. 1, 1992; 534 pgs.
Tichy, W., RCS—A System for Version Control [online], Jan. 3, 1991, [Retrieved Aug. 6, 2007], Retrieved from: http://www.cs.purdue.edu/homes/trinkle/RCS/rcs.ps; 20 pgs.
TOPS-20 [online], Wikipedia, [Retrieved Mar. 4, 2007], Retrieved from: http://en.wikipedia.org/wiki/TOPS-20; 4 pgs.
Tridgell, "Inside Microsoft Networking", Jun. 25, 1998, 6 pgs.
U.S. Official Action dated Feb. 2, 2010 cited in U.S. Appl. No. 11/182,989, 18 pgs.
U.S. Official Action dated Jan. 25, 2010 cited in U.S. Appl. No. 11/182,251, 20 pgs.
U.S. Official Action dated Jul. 23, 2010 cited in U.S. Appl. No. 11/182,989, 17 pgs.
U.S. Official Action dated Jul. 30, 2010 cited in U.S. Appl. No. 11/182,251, 23 pgs.
U.S. Official Action dated Mar. 13, 2009 cited in U.S. Appl. No. 11/182,251, 20 pgs.
U.S. Official Action dated May 14, 2009 cited in U.S. Appl. No. 11/182,989, 23 pgs.
U.S. Appl. No. 11/182,251, Amendment and Response filed Oct. 11, 2012, 2 pgs.
U.S. Appl. No. 11/182,251, Amendment and Response filed Nov. 26, 2008, 12 pgs.

(56) References Cited

OTHER PUBLICATIONS

U.S. Appl. No. 11/182,251, Amendment and Response filed Nov. 30, 2010, 17 pgs.
U.S. Appl. No. 11/182,251, Amendment and Response filed Nov. 4, 2011, 17 pgs.
U.S. Appl. No. 11/182,251, Amendment and Response filed Apr. 26, 2010, 17 pgs.
U.S. Appl. No. 11/182,251, Amendment and Response filed May 30, 2012, 14 pgs.
U.S. Appl. No. 11/182,251, Amendment and Response filed Jun. 15, 2009, 14 pgs.
U.S. Appl. No. 11/182,251, Amendment and Response filed Sep. 14, 2009, 7 pgs.
U.S. Appl. No. 11/182,251, Notice of Allowance mailed Jul. 12, 2012, 8 pgs.
U.S. Appl. No. 11/182,251, Office Action mailed Jan. 30, 2012, 24 pgs.
U.S. Appl. No. 11/182,251, Office Action mailed Nov. 6, 2008, 4 pgs.
U.S. Appl. No. 11/182,251, Office Action mailed Aug. 22, 2008, 7 pgs.
U.S. Appl. No. 11/182,251, Office Action mailed Aug. 4, 2011, 23 pgs.
U.S. Appl. No. 12/964,749, Amendment and Response filed Apr. 29, 2013, 9 pgs.
U.S. Appl. No. 12/964,749, Amendment and Response filed Aug. 23, 2013, 8 pgs.
U.S. Appl. No. 12/964,749, Notice of Allowance mailed Nov. 15, 2013, 2 pgs.
U.S. Appl. No. 12/964,749, Notice of Allowance mailed Sep. 5, 2013, 11 pgs.
U.S. Appl. No. 12/964,749, Office Action mailed Jan. 29, 2013, 17 pgs.
U.S. Appl. No. 12/964,749, Office Action mailed May 23, 2013, 13 pgs.
U.S. Appl. No. 13/172,757, Amendment and Response filed Mar. 6, 2014, 16 pgs.
U.S. Appl. No. 13/172,757, Amendment and Response filed Aug. 19, 2013, 14 pgs.
U.S. Appl. No. 13/172,757, Office Action mailed Dec. 6, 2013, 27 pgs.
U.S. Appl. No. 13/172,757, Office Action mailed Apr. 19, 2013, 23 pgs.
U.S. Appl. No. 13/174,271, Amendment and Response filed Apr. 10, 2014, 10 pgs.
U.S. Appl. No. 13/174,271, Notice of Allowance mailed May 29, 2014, 10 pgs.
U.S. Appl. No. 13/174,271, Notice of Allowance mailed Aug. 8, 2014, 2 pgs.
U.S. Appl. No. 13/174,271, Office Action mailed Jan. 10, 2014, 17 pgs.
U.S. Appl. No. 13/174,271, Supplemental Notice of Allowance mailed Sep. 8, 2014, 2 pgs.
U.S. Appl. No. 13/228,732, Amendment after Allowance filed Jun. 4, 2014, 7 pgs.
U.S. Appl. No. 13/228,732, Amendment and Response filed Nov. 8, 2013, 15 pgs.
U.S. Appl. No. 13/228,732, Notice of Allowance mailed Mar. 4, 2014, 17 pgs.
U.S. Appl. No. 13/228,732, Office Action mailed Jul. 8, 2013, 16 pgs.
U.S. Appl. No. 13/228,732, USPTO response to Amendment after Allowance mailed Jun. 27, 2014, 2 pgs.
U.S. Appl. No. 13/228,818, Amendment and Response filed Oct. 18, 2013, 24 pgs.
U.S. Appl. No. 13/228,818, Amendment and Response filed Nov. 17, 2014, 14 pgs.
U.S. Appl. No. 13/228,818, Amendment and Response filed Nov. 25, 2013, 28 pgs.
U.S. Appl. No. 13/228,818, Amendment and Response filed Jun. 16, 2014, 15 pgs.
U.S. Appl. No. 13/228,818, Office Action mailed Mar. 14, 2014, 18 pgs.
U.S. Appl. No. 13/228,818, Office Action mailed Jul. 18, 2013, 18 pgs.
U.S. Appl. No. 13/228,818, Office Action mailed Aug. 15, 2014, 17 pgs.
U.S. Appl. No. 13/663,827, Advisory Action mailed Aug. 22, 2013, 3 pgs.
U.S. Appl. No. 13/663,827, Amendment and Response filed Apr. 29, 2013, 10 pgs.
U.S. Appl. No. 13/663,827, Amendment and Response filed Aug. 6, 2013, 7 pgs.
U.S. Appl. No. 13/663,827, Amendment and Response filed Sep. 9, 2013, 8 pgs.
U.S. Appl. No. 13/663,827, Notice of Allowance mailed Jan. 13, 2014, 10 pgs.
U.S. Appl. No. 13/663,827, Notice of Allowance mailed Apr. 25, 2014, 10 pgs.
U.S. Appl. No. 13/663,827, Notice of Allowance mailed Sep. 26, 2013, 11 pgs.
U.S. Appl. No. 13/663,827, Office Action mailed Jan. 29, 2013, 16 pgs.
U.S. Appl. No. 13/663,827, Office Action mailed May 7, 2013, 16 pgs.
U.S. Appl. No. 13/664,012, Amendment and Response filed Mar. 19, 2014, 7 pgs.
U.S. Appl. No. 13/664,012, Amendment and Response filed Apr. 24, 2013, 10 pgs.
U.S. Appl. No. 13/664,012, Amendment and Response filed Jul. 30, 2013, 12 pgs.
U.S. Appl. No. 13/664,012, Notice of Allowance mailed Dec. 24, 2013, 11 pgs.
U.S. Appl. No. 13/664,012, Notice of Allowance mailed May 20, 2014, 13 pgs.
U.S. Appl. No. 13/664,012, Notice of Allowance mailed Sep. 12, 2013, 14 pgs.
U.S. Appl. No. 13/664,012, Office Action mailed Jan. 25, 2013, 19 pgs.
U.S. Appl. No. 13/664,012, Office Action mailed Apr. 30, 2013, 16 pgs.
U.S. Appl. No. 11/182,989, Amendment and Response filed Dec. 1, 2011, 13 pgs.
U.S. Appl. No. 11/182,989, Amendment and Response filed May 29, 2012, 11 pgs.
U.S. Appl. No. 11/182,989, Amendment and Response mailed Oct. 19, 2009, 6 pgs.
U.S. Appl. No. 11/182,989, Amendment and Response mailed Oct. 29, 2010, 14 pgs.
U.S. Appl. No. 11/182,989, Amendment and Response mailed Nov. 26, 2008, 12 pgs.
U.S. Appl. No. 11/182,989, Amendment and Response mailed May 3, 2010, 14 pgs.
U.S. Appl. No. 11/182,989, Amendment and Response mailed Aug. 14, 2009, 11 pgs.
U.S. Appl. No. 11/182,989, Notice of Allowance mailed Jun. 21, 2012, 5 pgs.
U.S. Appl. No. 11/182,989, Office Action mailed Feb. 28, 2012, 20 pgs.
U.S. Appl. No. 11/182,989, Office Action mailed Sep. 1, 2011, 19 pgs.
U.S. Appl. No. 11/182,989, Office Action mailed Sep. 5, 2008, 6 pgs.
Vanwasi, "Unleashing the power of P2P"; Network Magazine India; Apr. 2002; 5 pgs.
Zhu, "The Simple and Protected Generic Security Service Application Program Interface (GSS-API) Negotiation Mechanism", RFC-4178, Oct. 2005, http://www.ietf.org/rfc/rfc4178.txt, 20 pgs.
European Supplementary Search Report in Application 11846483.3, mailed Dec. 16, 2014, 10 pgs.
European Communication in Application 11846483.3, mailed Jan. 12, 2015, 1 page.
Chinese 3rd Office Action in Application 201110329007.4, mailed Dec. 29, 2014, 6 pgs.

(56) References Cited

OTHER PUBLICATIONS

U.S. Appl. No. 14/473,488, Notice of Allowance mailed Jan. 26, 2015, 15 pgs.
New Zealand Notice of Acceptance in Application 622122, mailed Jan. 15, 2015, 1 page.
U.S. Appl. No. 14/473,488, Notice of Allowance mailed Feb. 12, 2015, 5 pgs.
European Extended Search Report in Application 12829430.3, mailed Feb. 12, 2015, 6 pgs.
Chinese 2nd Office Action in Application 201210331041.X, mailed Mar. 9, 2015, 10 pgs.
European Communication and partial Search Report in Application 12830847.5, mailed Mar. 18, 2015, 6 pgs.
European Communication in Application 12829430.3, mailed Mar. 3, 2015, 1 page.
U.S. Appl. No. 14/473,488, Notice of Allowance mailed Apr. 16, 2015, 2 pgs.
U.S. Appl. No. 13/228,818, Office Action mailed Mar. 25, 2015, 18 pgs.
U.S. Appl. No. 13/172,757, Office Action mailed Apr. 10, 2015, 34 pgs.
Chinese Notice of Allowance in Application 201110462797.3, mailed Mar. 3, 2015, 4 pgs.
European Search Report in Application 12805065.5, mailed Jun. 1, 2015, 9 pgs.
Sapuntzakis, C. et al., Internet Draft: "TCP RDMA option"; Available at: draft-csapuntz-tcprdma-00.txt, Feb. 1, 2000, 20 pgs.
Defense Advanced Research Projects Agency, by Information Sciences Institute Univ. of So. CA., "Internet Protocol—DARPA Internet Program Protocol Specification"; Available at: https://www.rfc-editor.org/rfc/rfc791.txt, Sep. 1, 1981, 52 pgs.
Recio, R. et al., "A Remote Direct Memory Access Protocol Specification", Network Working Group Request for Comments: 5040, Available at: https://tools.ietf.org/html/rfc5040, Oct. 1, 2007, 66 pgs.
European Partial Search Report in Application 12804233.0, mailed May 7, 2015, 7 pgs.
South African Notice of Allowance in Application 2014/01381, mailed May 5, 2015, 1 page.
U.S. Appl. No. 13/172,757, Amendment and Response filed Jul. 10, 2015, 17 pgs.
European extended Search Report in Application 12804233.0, mailed Jul. 15, 2015, 18 pgs.
European extended Search Report in Application 12830847.5, mailed Jul. 7, 2015, 11 pgs.
European Communication in Application 12830847.5, mailed Jul. 24, 2015, 1 page.
European Communication in Application 12805065.5, mailed Jun. 18, 2015, 1 page.
Chinese Notice of Allowance in Application 201110329007.4, mailed Jul. 1, 2015, 6 pgs.
Chinese 2nd Office Action in Application 201210434813.2, mailed Jun. 30, 2015, 7 pgs.
Chinese 2nd Office Action in Application 201210330725.8, mailed Jul. 1, 2015, 7 pgs.
Chinese 1st Office Action and Search Report Issued in Chinese Patent Application No. 201280032558.7, Mailed Date: Aug. 5, 2015, 19 Pages.
U.S. Appl. No. 14/475,081, Office Action mailed Aug. 18, 2015, 17 pgs.
European Communication in Application 12804233.0, mailed Jul. 31, 2015, 1 page.
Chinese 3rd Office Action in Application 201210331041.X, mailed Aug. 18, 2015, 7 pgs.
European Notice of Allowance in Application 11846483.3, mailed Aug. 11, 2015, 7 pgs.
European Office Action in Application 12829430.3, mailed Oct. 6, 2015, 4 pgs.
Indian Office Action in Patent Application No. 3306/DEL/2005, mailed Aug. 10, 2015, 2 pages.
U.S. Appl. No. 13/946,550, Office Action mailed Sep. 23, 2015, 24 pgs.
Japanese Office Action in Application 2013-543293, mailed Nov. 4, 2015, 15 pgs.
Chinese Office Action in Application 201280032570.8, mailed Dec. 11, 2015, 15 pgs.
Chinese Notice of Allowance in Application 201210434813.2, mailed Oct. 10, 2015, 4 pgs.
U.S. Appl. No. 14/475,081, Amendment and Response filed Nov. 18, 2015, 14 pgs.
U.S. Appl. No. 13/172,757, Notice of Allowance mailed Nov. 12, 2015, 11 pgs.
Australian Office Action in Application 2012275906, mailed Jan. 11, 2016, 3 pgs.
Chinese 4th Office Action in Application 201210331041.X, mailed Jan. 20, 2016, 10 pgs.
Chinese 3rd Office Action in Application 201210330725.8, mailed Jan. 20, 2016, 11 pgs.
Israeli Communication in Application 231373, mailed Dec. 28, 2015, 3 pgs.
Singapore Notice of Allowance and Supplemental Examination Report in Application 11201400442S, mailed Jan. 26, 2016, 4 pgs.
U.S. Appl. No. 13/946,550, Amendment and Response filed Dec. 23, 2015, 10 pgs.
U.S. Appl. No. 14/475,081, Office Action mailed Jan. 21, 2016, 18 pgs.
U.S. Appl. No. 13/172,757, Notice of Allowance mailed Jan. 21, 2016, 2 pgs.

\* cited by examiner

DATA COMMUNICATION COORDINATION WITH SEQUENCE NUMBERS

CROSS-REFERENCE TO RELATED APPLICATIONS

The present application is a continuation of and claims priority to U.S. patent application Ser. No. 14/473,488, now U.S. Pat. No. 9,071,661, filed Aug. 29, 2014, which is a continuation of and claims priority to U.S. Pat. No. 8,850,025, issued Sep. 30, 2014, which is a continuation of and claims priority to U.S. Pat. No. 8,316,129, issued Nov. 20, 2012, which claims priority to U.S. Provisional Patent Application Ser. No. 60/685,008, filed May 25, 2005. The entirety of the above-listed Applications are incorporated herein by reference. To the extent appropriate, a claim of priority is made to the above-recited applications. The present application is related to copending U.S. Pat. No. 8,332,526, issued Dec. 11, 2012 and to copending U.S. Pat. No. 8,825,885, issued Sep. 2, 2014, entitled "Data Communication Protocol" each of which is assigned to the assignee of the present invention and are hereby incorporated by reference.

BACKGROUND

Many data communication protocols that are still in use today, such as the SMB (Server Message Block) protocol, were developed at a time when computing resources were very different, e.g., network bandwidth was typically limited and memory was very precious. As a result, when used in contemporary networks, such protocols may limit overall performance. For example, because of having been designed when memory was limited, small buffer sizes are used, requiring more round trips to communicate large amounts of data.

Moreover, the existing SMB protocol has other limitations that have become apparent over time. For example, the existing SMB protocol is susceptible to denial of service attacks; the design of the protocol makes it difficult to fight these attacks. Likewise, the method for ensuring packet security is cumbersome. Also, there is no current mechanism for performing quality of service-like operations, in that a trusted client, for example, obtains the same server resources as an untrusted client. In sum, while still a frequently-used and valuable protocol, existing SMB versions are less than ideal when used with contemporary network resources.

SUMMARY

Briefly, various aspects of the present invention are directed towards the use of sequence numbers for client-server communication, such as incorporated into a data communication protocol, to control a client's use of server resources. Various aspects apply the use of sequence numbers to a protocol where ordering is not important, but provide for quality of service, denial of service combating, division of server resources, secure message signing, and other numerous benefits.

A server grants the client credits, and the client uses a credit for sending each command to the server. Each credit corresponds to a sequence number, with the set of sequence numbers forming a valid command window. The server enforces that for each received command, the command includes a sequence number that is within the valid command window and that the sequence number has not been used with another command. The server may also maintain a maximum window size, such that even a client that has credits cannot send a command with a sequence number that beyond a maximum sequence number corresponding to the maximum window size.

In general, upon receiving a command from the client, the server verifies that the sequence number is within the window and has not been used before. The server then eliminates the corresponding sequence number from among those that the client can use, thereby consuming one credit. The server then determines whether to grant the client one or more other credits.

Thus, there is provided a mechanism for limiting use of server resources by controlling a number of credits granted to the client, via a valid operation window containing a unique number for each credit granted to the client. An enforcement mechanism ensures that to allow further server operations on a received command, the command includes a sequence number that is within the valid operation window and that the unique number has not been used with another command An allocation mechanism that controls credits granted to the client and the unique numbers within the valid operation window.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
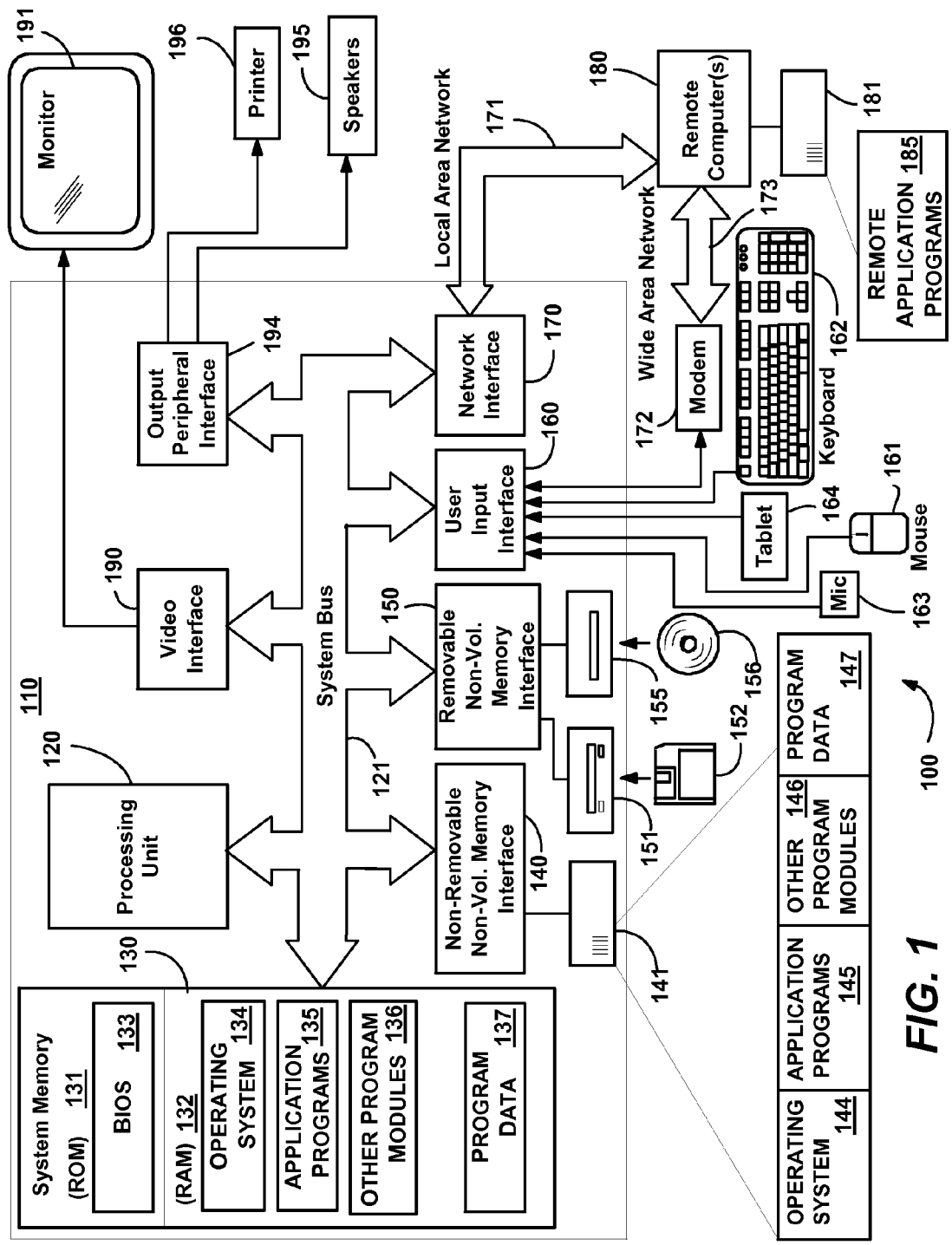
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Data Communication Coordination with Sequence Numbers

Various aspects of the technology described herein are directed towards a mechanism that may be employed in a data communication protocol, such as a modified version (2.x or greater) of the SMB protocol. In one example implementation generally described herein, the mechanism controls data/command flow in this revised SMB protocol, which is used for Windows®-based file sharing. However, as can be readily appreciated, the present invention is not limited to Windows®-based systems or the SMB protocol, but rather, the example technique is applicable to other file sharing protocols and data communication protocols in general, including those that do not necessarily deal with file data. For example, numerous ways to implement the present invention are feasible, including for use in communication with printers, named data pipes, generic devices and so forth. As such, the present invention is not limited to any of the particular file-based or other examples used herein, but rather may be used numerous ways that provide benefits and advantages in computing in general.

Figure 2:
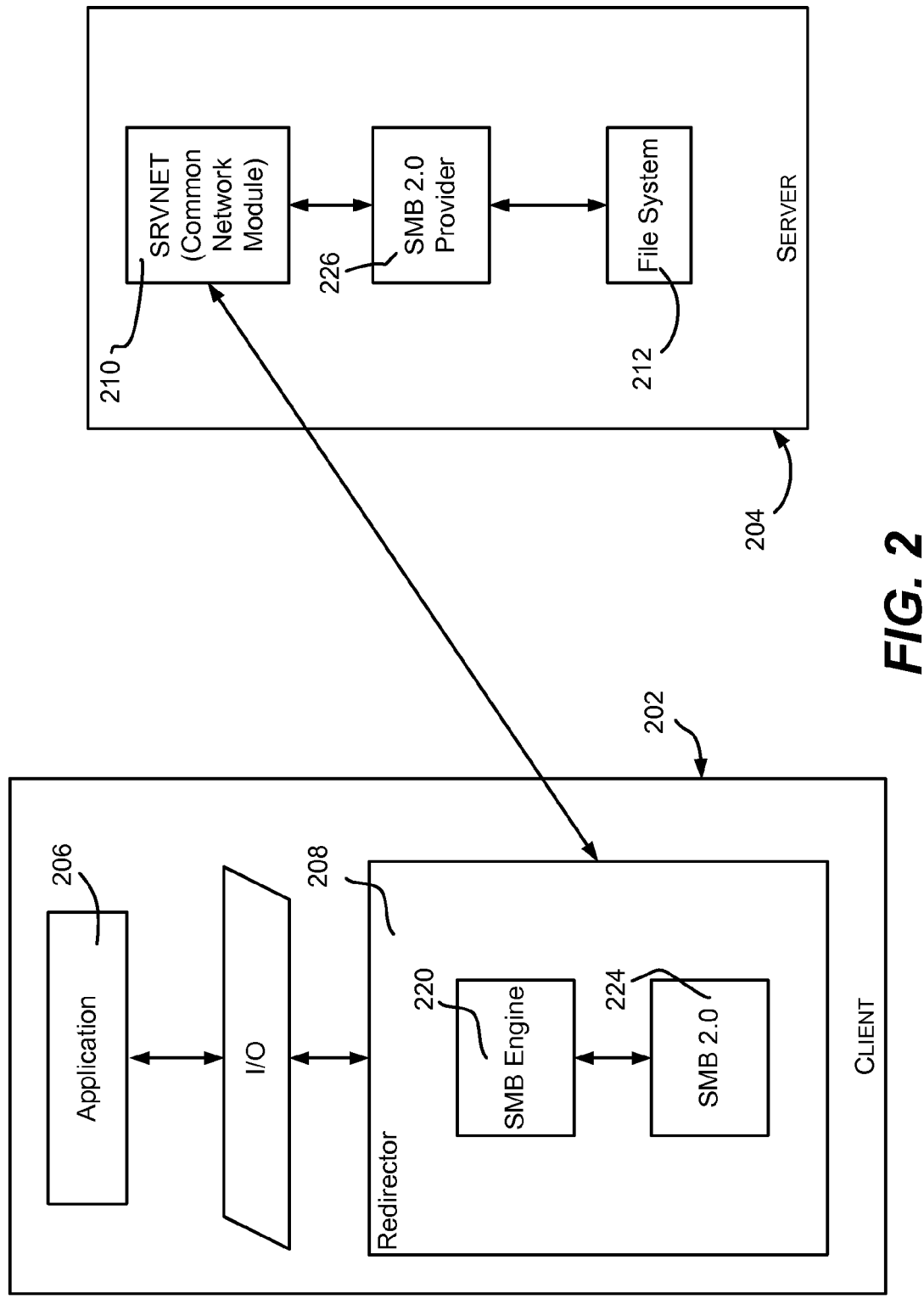
FIG. 2 is a block diagram representing an example network environment in which a client communicates with a server in accordance with various aspects of the present invention.

Turning to FIG. 2 of the drawings, there is shown a block diagram representing an example networking environment in which a client 202 communicates with a server 204 through one or more communication channels. Although the functions and components of the client machine 202 and the server 204 are described as being located within two separate computers, such as the main computer system 110 and remote computer system 180 of FIG. 1, the components of these two computers or the functions performed thereby may be provided on one machine, or may be distributed over a number of computers. For example, a computer system may comprise one of variety of network appliance devices, such as print servers or printers themselves, as well as NAS storage devices, and the like.

Network file system commands from an application program 206 are handled by a client redirector component 208, which communicates with a counterpart common network module (SRVNET) 210 to carry out the commands on the file system 212. In general, the client 202 establishes a connection and then negotiates with the server 204 to ultimately set up a session. As part of this, before file system-directed commands are processed, the client and server agree upon a communication protocol. In this example, the agreed-upon protocol for this connection/session is SMB 2.0, whereby a client-side SMB engine 220 employs an SMB 2.0 driver for communications to and from the server 204. The common network module (SRVNET) 210 similarly employs an SMB 2.0 provider 226 for handling client communications over this connection. The provider 226 includes or is otherwise associated with the enforcement mechanism and data structures that ensure that a client uses a proper sequence number, as described below.

Turning to the concept of data communication coordination with sequence numbers, sequence numbers provide a mechanism by which a server may throttle the amount of work a given client can issue against the server. As will be understood, this is accomplished by having the server provide a window of available sequence numbers that the client is allowed to use when identifying a given command. To implement sequence numbers and the desired behavior, the concept of credits is employed, where a credit grants the client the right to consume a portion of server-side resources, including the memory required to back an operation and the CPU cycles it may consume. A client consumes a credit on each command sent, and depending on the server's response, may be granted zero, one or more additional credits. A client is not allowed to reuse a sequence number, and thus the number of commands a client can issue is controlled. Note that monotonically increasing sequence numbers are used for convenience, however any unique (per session/connection) number is equivalent.

For example, if a server grants a client five credits, the server is giving the client the right to submit up to five operations simultaneously. When a server needs to throttle a client, the server does so by reducing the available credits to that client. When a server wants to give a client more resources to work with, the server does so by granting credits.

This gives the server several options. By granting zero credits to a client, the server runs down the resources allocated to that client. Alternatively, by returning one credit, the server maintains the previous window size. By returning more than one credit, the server allows the client more resources for executing commands. One restriction is that the server cannot allow the window size to hit zero (no valid sequence numbers), unless the server has a method of granting a credit out of band, assuming that the protocol is strictly a command-response protocol. Note that if there is a method of granting a client credits without requiring the client to ask for them in the protocol that is using this method, then the restriction does not apply.

Note that a negotiate request/response has a sequence number, (also referred to as a message identifier, or MID) of zero, and a window size of one. In SMB 2.0, the following header facilitates the passing of such information, as further described in the aforementioned related, copending United States patent application entitled "Data Communication Protocol":

```
typedef struct __SMB2_HEADER {
    UCHAR       Protocol[4];      // Contains 0xFE, 'S', 'M', 'B'
    USHORT      StructureSize;    // = sizeof(SMB2_HEADER).
                                  //   (versioning)
    USHORT      Epoch;            // incremented every time the server
                                  // restarts
    NTSTATUS    Status;           // Status of the command
    USHORT      Command;          // The command for this packet
                                  // union
```

```
{
    USHORT      CreditsRequested;   // On client send, request for more
                                    // credits
    USHORT      CreditsGranted;     // On server response, credits
                                    // granted to client
};
ULONG           Flags;
ULONG           Reserved;
UINT64          MessageId;          // Identifies this message
                                    // send/response
union
{
    struct
    {
        UINT64  ProcessId;          // Process identifier
        UINT64  SessionId;          // Session identifier
        ULONG   TreeId;             // Tree Connect identifier
    };
    struct
    {
        UINT64  AsyncId;            // Used to identify long standing
                                    // commands
    };
}
UCHAR           Signature[8];       // Signature for the packet
ULONG           NextCommand;        // Offset from to next
} _SMB2_HEADER, *PSMB2_HEADER;
```

As can be seen from the above header structure, the client requests as many credits as desired, however the server is in control of granting credits to the client. The server thus has the ability to shrink or grow the window based on the client's identity, behavior, or any other attributes or criteria. Sequence numbers also provide a way to uniquely identify a command sent from the client to the server for a given connection.

The client and server begin by establishing a command window. The command window starts by using either a default or a negotiated initial sequence number (ISN) (also referred to as an initial message identifier, or MID) and number of credits (NoC), which represents the range of allowable numbers the server will accept to identify a given command. Thus, the command window initially comprises [ISN, ISN+NoC−1]. For most protocols, the default may be ISN=1, NoC=1, so when first negotiated the command window is simply [1,1], representing that the only sequence number the server will accept to identify a command is one (1).

As communications progress, the client moves the down the numbers in the window by using up numbers within the range. Once a number is used, it cannot be reused, as this is enforced by the server. At the same time, the server may, as determined by the server, extend the end of the window by granting more credits to the client. For example, if the command window is [A, B], when the client sends command A, the valid command window becomes essentially [A+1, B]. When the server responds to command A, it can grant the client anywhere from zero to any practical number of credits. Thus, if the server returned N credits, the valid command window becomes [A+1, B+N].

The use of the sequence numbers in the allowable range is not required to be in order. The protocol is setup to facilitate asynchronous use of the sequence numbers, as long as the number being used is within the valid range. This allows the network protocol to send packets as they are available, instead of trying to force ordered sends. Thus, if sequence number A is claimed for a very large packet, but while the buffers are being prepared sends for A+1 and A+2 come in and are very small, it is legal to send A+1 and A+2 (as long as the end of the window is >=A+2) without waiting for the send of A to start.

Note that if there is a valid command window of [1,5], and packets 2, 3, 4 are sent, the server may grant credits back allowing for a window of [1,8] except {2, 3, 4} (meaning all numbers between 1 and 8 except 2 thru 4). Eventually, the server will likely stop granting credits until packet 1 is sent and the window is allowed to slide. If at this point, the client sends 1, and the server responds granting a credit, than the window becomes [5,9].

The enforcement of the valid command window is done on the server side. This system permits a client-side structure to be as simple as having the current sequence number and the max sequence number, and using interlocked compares and increments as the only required synchronization method.

Thus, a valid command window, also referred to as a valid operation or Valid Op window) comprises the window of valid identifiers that the server will accept. The client sends each subsequent command with the next valid sequence number, (up to its valid credits), and need not maintain a view of the valid window. The client is required to understand the concept of a "Maximum Window Size" as described below). Examples of the use of the valid command/operation window are set forth below.

Any operation that could block for an indefinite amount of time, such as a change-notify or a named-pipe read, or create (as it may pend on an oplock break), is considered a blocking operation. To facilitate such operations, the client may supply an "operation context" value, i.e., a blocking flag, in the command send. The server will then respond when it successfully initiates the operation, allowing the sequence number to be incremented, even though the operation is still in process on the server side. However, the resources held by such long-running operations can often be a subset of the resources required for a normal command. Thus, a server is allowed to determine the maximum number of "Blocking Op Credits" (also referred to as long-operation credits, or LOC) that a client is allowed to consume. Sequence numbers also allow for long-running commands and commands with multiple responses from the server, balanced by controlling how many resources the client can consume.

Thus, an extension to the valid command window is to allow the window to continue to slide as normal, and not be held up by operations that may take an indefinite amount of time. To this end, the client is granted a given number of Blocking Op credits by the server and any operation issued with the Blocking Op flag will consume a Blocking Op credit. When the server receives a command, the server may send an interim response back to the client with such a flag set that acknowledges the receipt of a long-standing command, and returns a long-standing command ID, also referred to as an asynchronous identifier (AsyncID). This response allows the valid command window to slide as it normally would. When the long-standing command is completed, a new response is sent back to the client using the long standing command ID to indicate to which packet it is responding. This send-response-response architecture allows the window to continue to move, and the credit mechanism allows the server to retain control over how many resources the client can consume. The server can even shrink the valid command window if there are a large number of long standing operations in progress from the client.

Alternative implementations include a protocol that allows the client to hint to the server that a long-standing command may be coming. Another implementation of the asynchronous concept also may have the client issue an interim "accept" or the like, such that an async/blocking operation takes the form, "send-rec-send-rec" as opposed to simply send-rec-rec. Note that some underlying transports (e.g., TCP) are often tuned for request-response traffic, and may introduce delays in a request-response-response situation.

Due to the asynchronous nature of the protocol and the transports, the current valid window will not be directly equal to the current minimum sequence ID plus the credits, since some intermediate commands may be received first, or, for example, the command with sequence ID=1 may take a long time to process. However, the server may place a limit on how large this valid window can grow before it is stopped from growing. Continuing with the above example, the server may specify that the maximum window size is ten (10). This means that the valid operation (command) window may grow to [1,10] if the server receives and processes packets 2,3,4,5, and 6 before its receives or completes processing of packet 1. Thus, the sequence numbers that would be valid are 1,7,8,9, 10. However, if the server then receives packet 7 and processes it, the valid operation (command) window will not slide to [1,11], but remains at [1,10] with acceptable sequence numbers of 1,8,9,10. The response on command 8 would indicate a (−1) credit to tell the client that the client is reaching the end of its acceptable limits, that is, its Credits value is now 4. This is one way in which the server prevents the client from ever skipping a given number in the sequence that would prevent the window from sliding nicely. This also demonstrates the value of issuing "Blocking Ops" against a server for commands that will take a long time.

Tracking the valid command window on the server side may be computationally expensive as the server needs to keep track of intersecting sets. To simplify this, one example implementation will establish the maximum window size described above, as the largest the server will ever let the command window become. Once this is established, the server allocates a buffer representing this size, and as commands come in, the value at that location in the buffer is changed. As long as the window size remains less than or equal to the maximum window size, then as the start of the window moves forward, the server moves its buffer pointer forward. Likewise, when the end grows as credits are granted, the server moves its end pointer along the buffer. Arithmetic handles situations where the buffer "wraps" the maximum window size. It is possible to grow the maximum window size dynamically, by allocating a larger buffer and copying the current values into it. Interlocked operations are used to track the status of the valid commands within the window, starting as AVAILABLE. Upon receiving the command from the client, they transition to IN_PROGRESS, and when the response (or interim response for a long-running command case) is sent, it transitions to USED. If the value transitioning to USED is the first value in the window, the window is slid forward until a non-USED value is encountered.

Another alternative allows for the server to revoke credits via an alternate channel or through unsequenced communication. For example, consider that the server has granted the client ten credits, but wants to trim the client down to five credits, which ordinarily will not happen until the client uses five commands. If the client is idle, the server may indicate to the client that it must use five credits in the next N seconds, or it will be in violation and terminated (or lose the credits). This allows the server to throttle down clients without relying on the client to move their own window.

Turning to an explanation of the operation of the invention via the use of various examples, the current state will be set forth in the format below:

| Min: | Current Credits: | Credits: | Valid: [1, 5] | Max: |
|---|---|---|---|---|
| 1 | (5, 1) | (5, 1) | except { } | [1, 11] |

The Min column shows the lowest unused client sequence number that the client is allowed to use; current credits are how many credits are granted to the client, in the form (normal credits, blocking op credits). A client consumes a credit on a send, and possibly re-increments on the receive (depending on the response). The next column, simply "Credits" shows the current maximum number of credits the client is allowed.

Valid and Max represent server-side structures for sequence identifier validation; (note that the client need not have any idea about these). Valid shows the Valid Op Window along with the exceptions of sequence identifiers that were already used (e.g., tracked by bitmap), and Max shows the MaxCommandWindow that the client can ever fill before completing the first operation, that is, the operation that would cause the window to shift.

FIGS. 3-9 represent an example on how the valid operation (Valid Op) window 330$_s$ grows as maintained at the server 204; (note that in FIGS. 3-9, as the valid operation window changes, the first digit of its label changes, e.g., FIG. 3 has a valid operation window labeled 330$_s$, FIG. 4 has a valid operation window labeled 430$_s$, and so forth.

Figure 3:
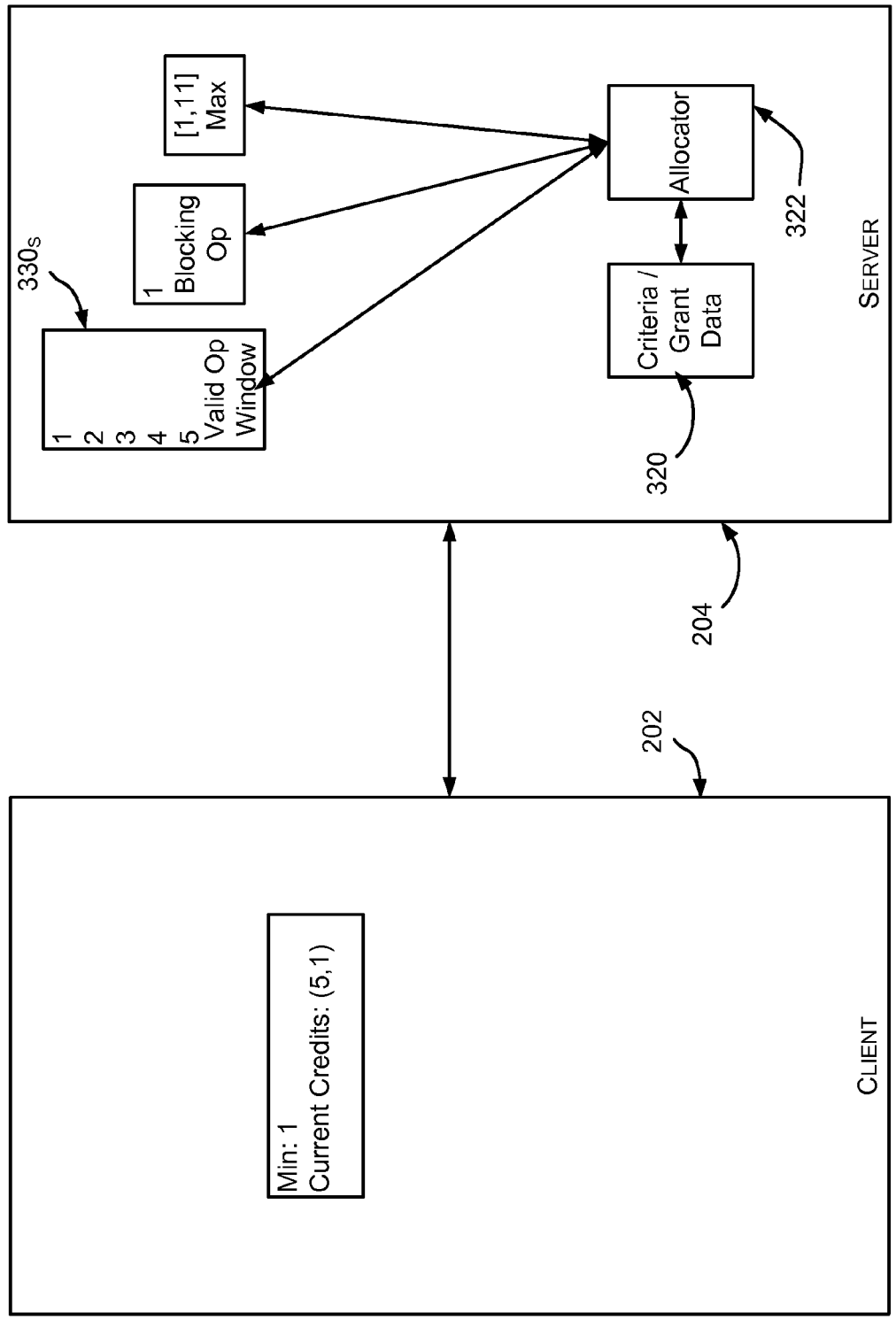
FIGS. 3-13 are representations of client and server data maintained for using sequence numbers, in accordance with various aspects of the present invention.

In FIG. 3, a client is granted 5 credits and a starting sequence number (or MID) of 1. Some criteria 320 as generally described above, e.g., the type of client, is used by an allocator component 322 to determine the amount to grant the client. In this example, the current valid operation window is thus [1,5], as represented vertically in FIG. 5 by individual digits in the window 330$_s$. The server 204 thus will accept a packet with sequence number 1,2,3,4 or 5 from this client 202. This is alternatively represented in the above-described format as follows:

| Min: | Current Credits: | Credits: | Valid: [1, 5] | Max: |
|---|---|---|---|---|
| 1 | (5, 1) | (5, 1) | except { } | [1, 11] |

The valid op window 320$_s$ is used to trivially reject packets; if they lie within the valid op window 320$_s$, the server 204 than checks an internal exception map to guarantee a sequence number has not been already used.

In the typical event of a monotonically increasing receive, the client sends a packet with MID=1, and the client and server transition to the state represented in FIG. 4 and in the table below; (note that [1,5] are considered valid, but 1 is only truly valid for a response from the server, not for another receipt from the client, which would fail against the Min=2 check first).

| Min: | Current Credits: | Credits: | Valid: [1, 5] | Max: |
|---|---|---|---|---|
| 2 | (4, 1) | (5, 1) | except {1} | [1, 11] |

Figure 4:
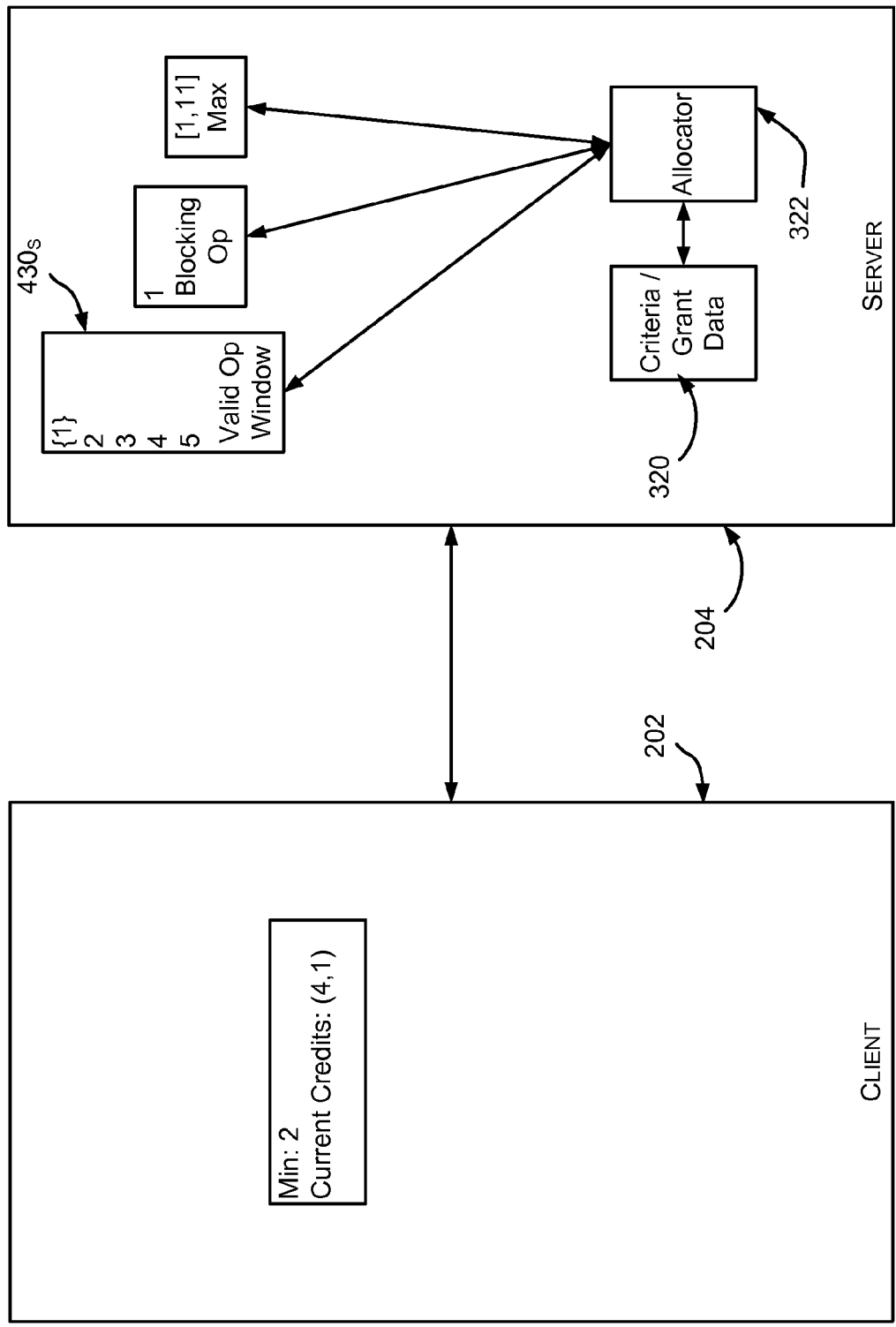

In FIG. 4, the server receives and processes the command with sequence number=1. This means that 1 is no longer a valid sequence number for subsequent commands, as represented by the bracketed {1} in the valid/exception column in the table above and in the valid operation window labeled $430_s$ in FIG. 4.

Figure 5:
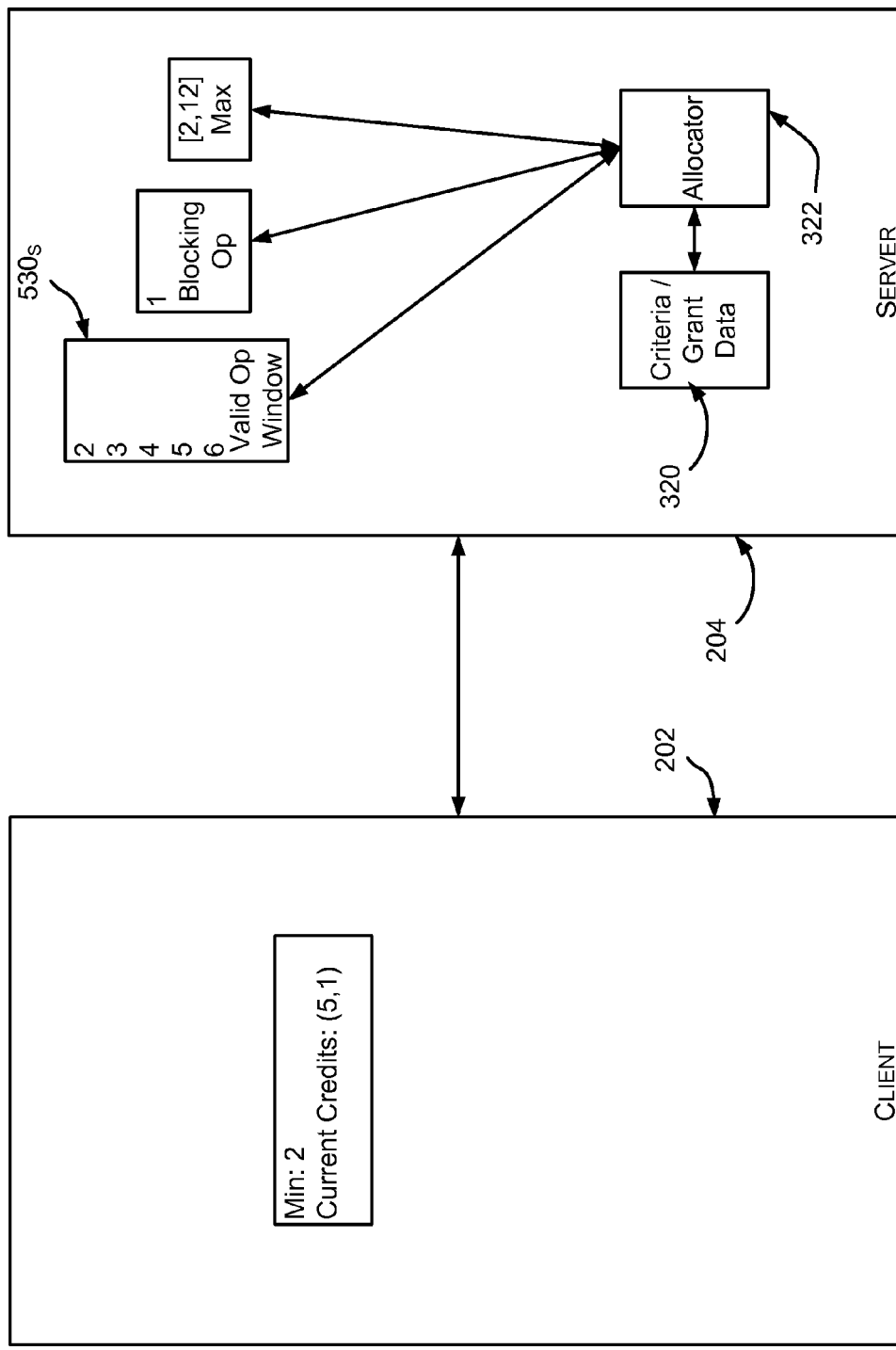

When the server responds, it grants the client an additional (+1) credit on the response, and slides the window, as represented in FIG. 5 and in the table below:

| Min: | Current Credits: | Credits: | Valid: [2, 6] | Max: |
|---|---|---|---|---|
| 2 | (5, 1) | (5, 1) | except { } | [2, 12] |

Figure 6:
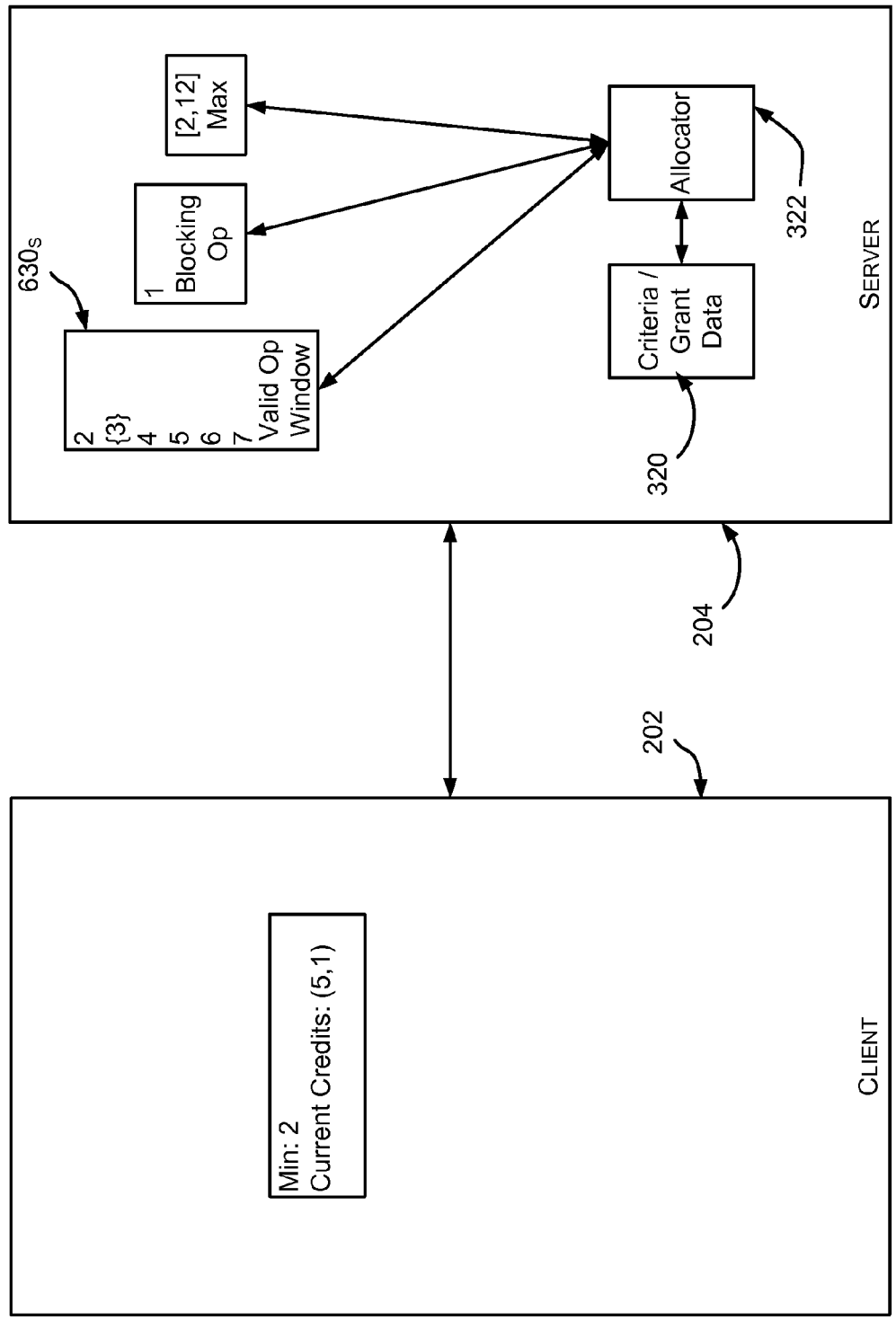
Figure 7:
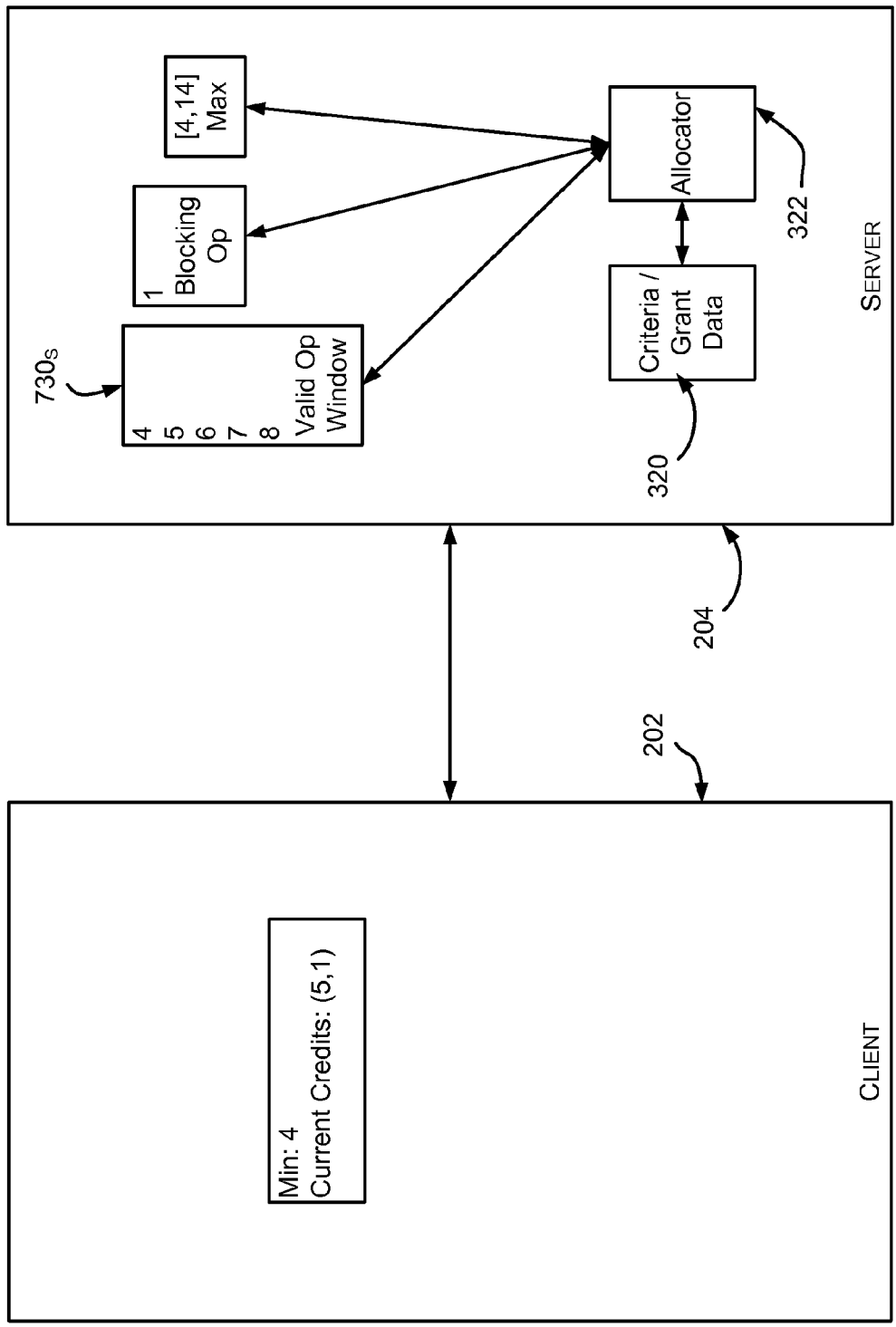

The client now has a valid window of [2,6]. Consider when an out-of-order receive occurs, e.g., the asynchronous send on the transport is such that the server received command 3 before command 2 (and responds to it). The valid op window $630_s$ would then conceptually exist as represented in FIG. 6 and as follows:

| Min: | Current Credits: | Credits: | Valid: [2, 7] | Max: |
|---|---|---|---|---|
| 2 | (5, 1) | (5, 1) | except {3} | [2, 12] |

Note that in the table, the valid window extends, but the maximum window does not slide. However, when the server receives command 2 and responds, the window $730_s$ will slide over both, as in FIG. 7 and as below:

| Min: | Current Credits: | Credits: | Valid: [4, 8] | Max: |
|---|---|---|---|---|
| 4 | (5, 1) | (5, 1) | except { } | [4, 14] |

Figure 8:
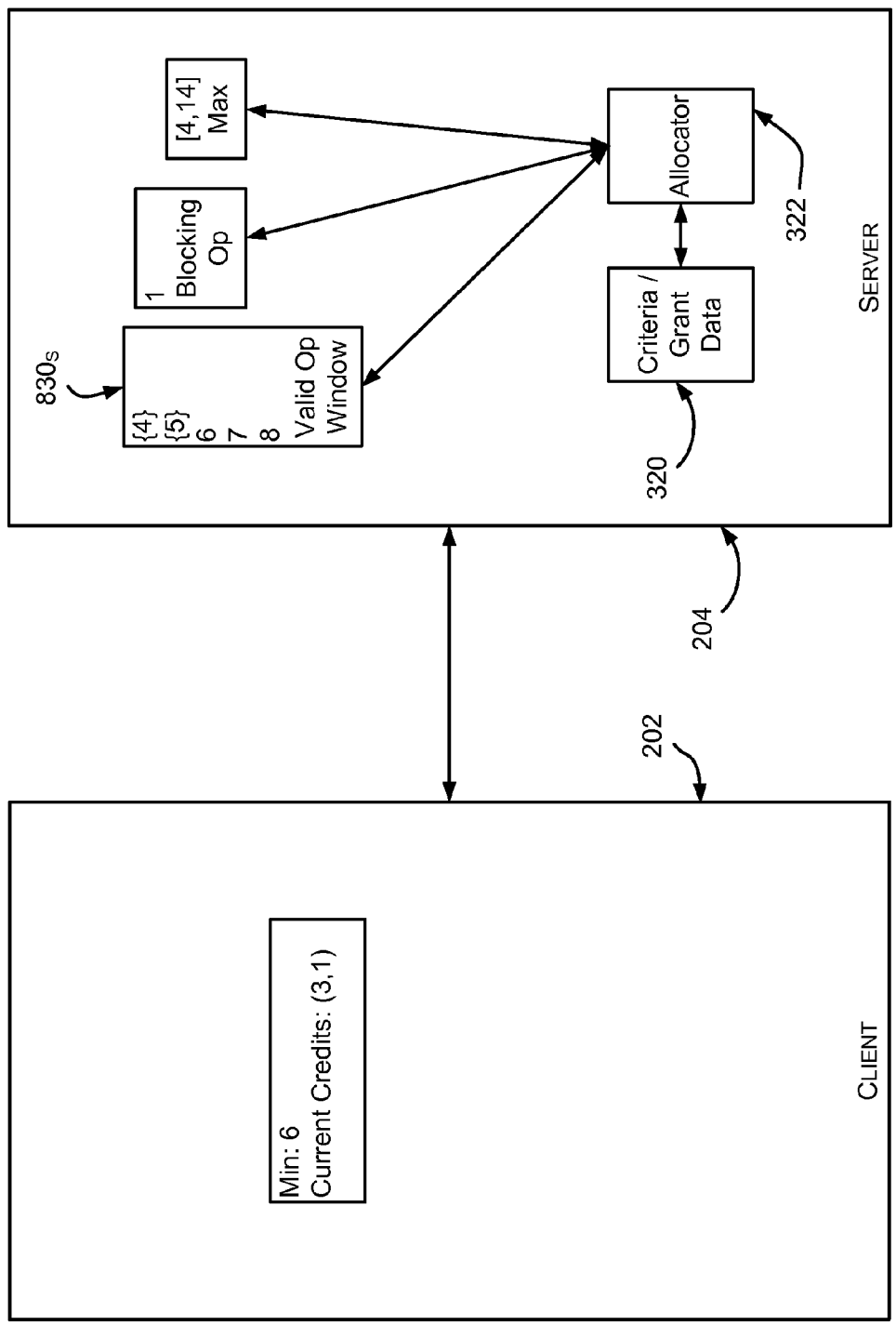

Consider next a malicious client attempting to use up resources on the server by sending commands and refusing the responses. Here the client has sent the server commands 4 and 5, and is refusing the responses. The state becomes as represented in FIG. 8 and as below:

| Min: | Current Credits: | Credits: | Valid: [4, 8] | Max: |
|---|---|---|---|---|
| 6 | (3, 1) | (5, 1) | except {4, 5} | [4, 14] |

Figure 9:
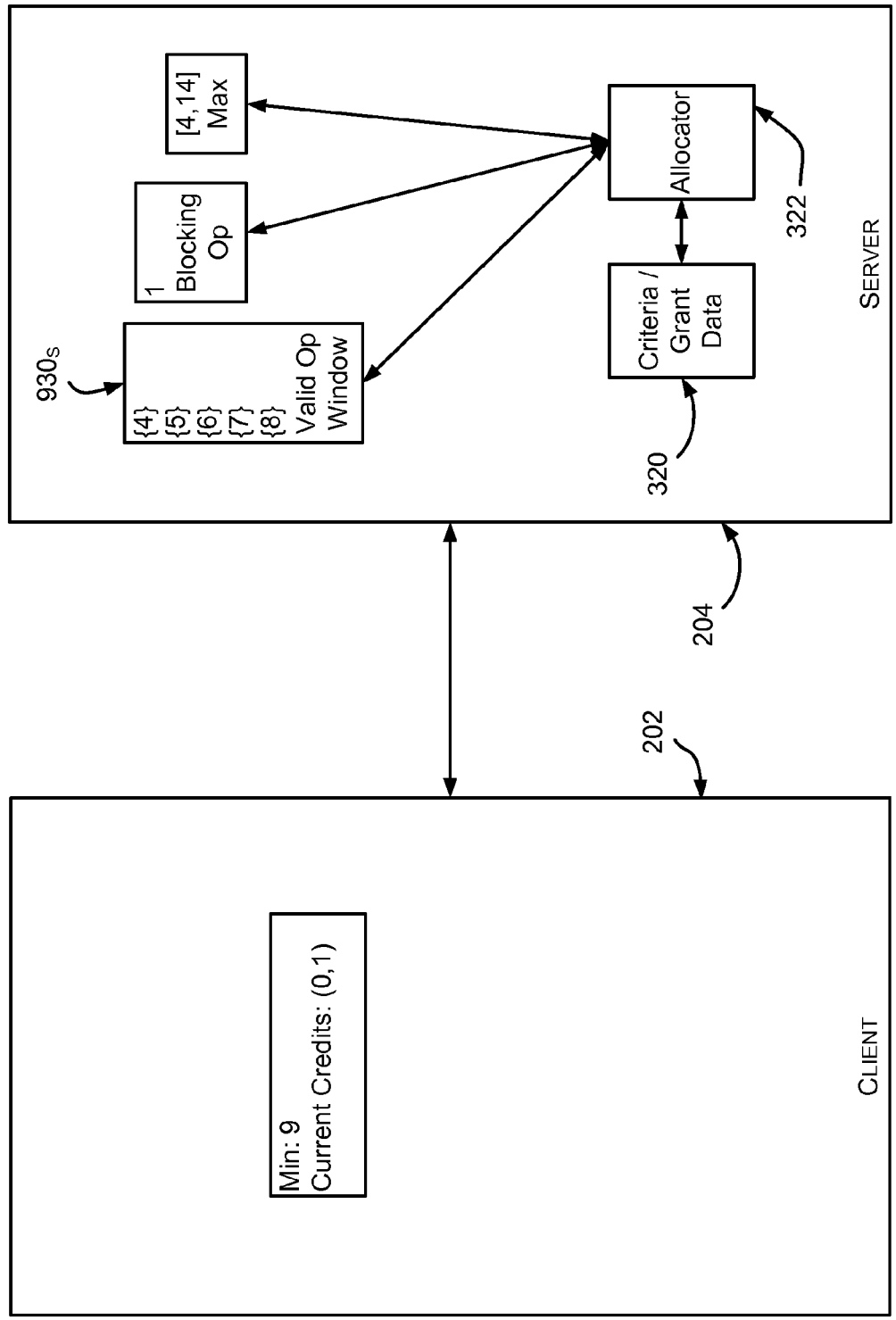

After commands with sequence identifiers 6,7,8 are sent, because of credit enforcement, the client is out of credits and all packets are refused, as represented in FIG. 9 and in the table below:

| Min: | Current Credits: | Credits: | Valid: [4, 8] | Max: |
|---|---|---|---|---|
| 9 | (0, 1) | (5, 1) | except {4, 5, 6, 7, 8} | [4, 14] |

Figure 10:
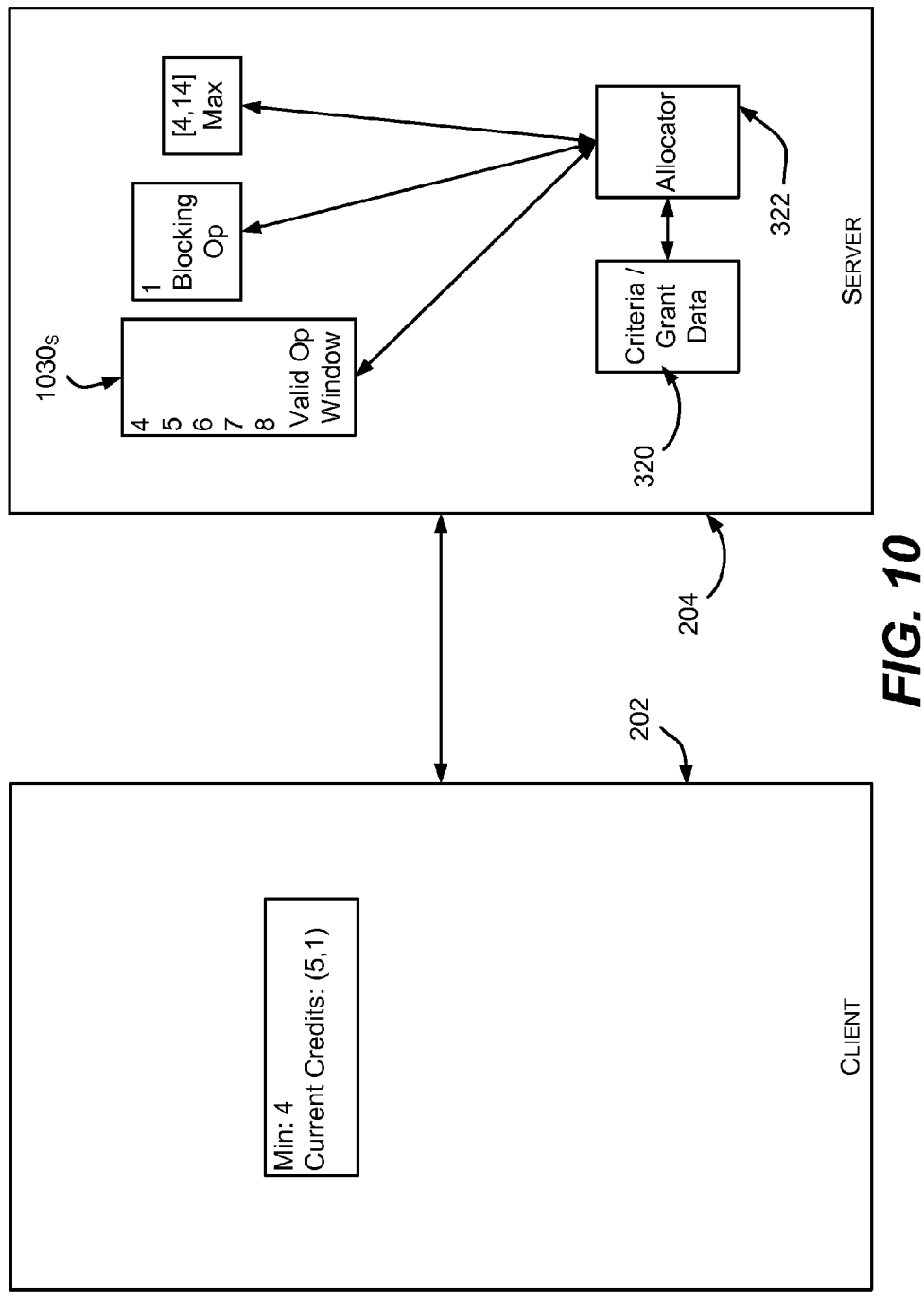

Turning to examples of maximum window enforcement, FIGS. 10-13 and similar tables are used. Consider a malicious client trying to send a packet N+1 and beyond, without sending us packet N. The examples of FIGS. 10-13 will start at the state before the last attacker, that is, FIG. 10 is essentially FIG. 7:

| Min: | Current Credits: | Credits: | Valid: [4, 8] | Max: |
|---|---|---|---|---|
| 4 | (5, 1) | (5, 1) | except { } | [4, 14] |

Figure 11:
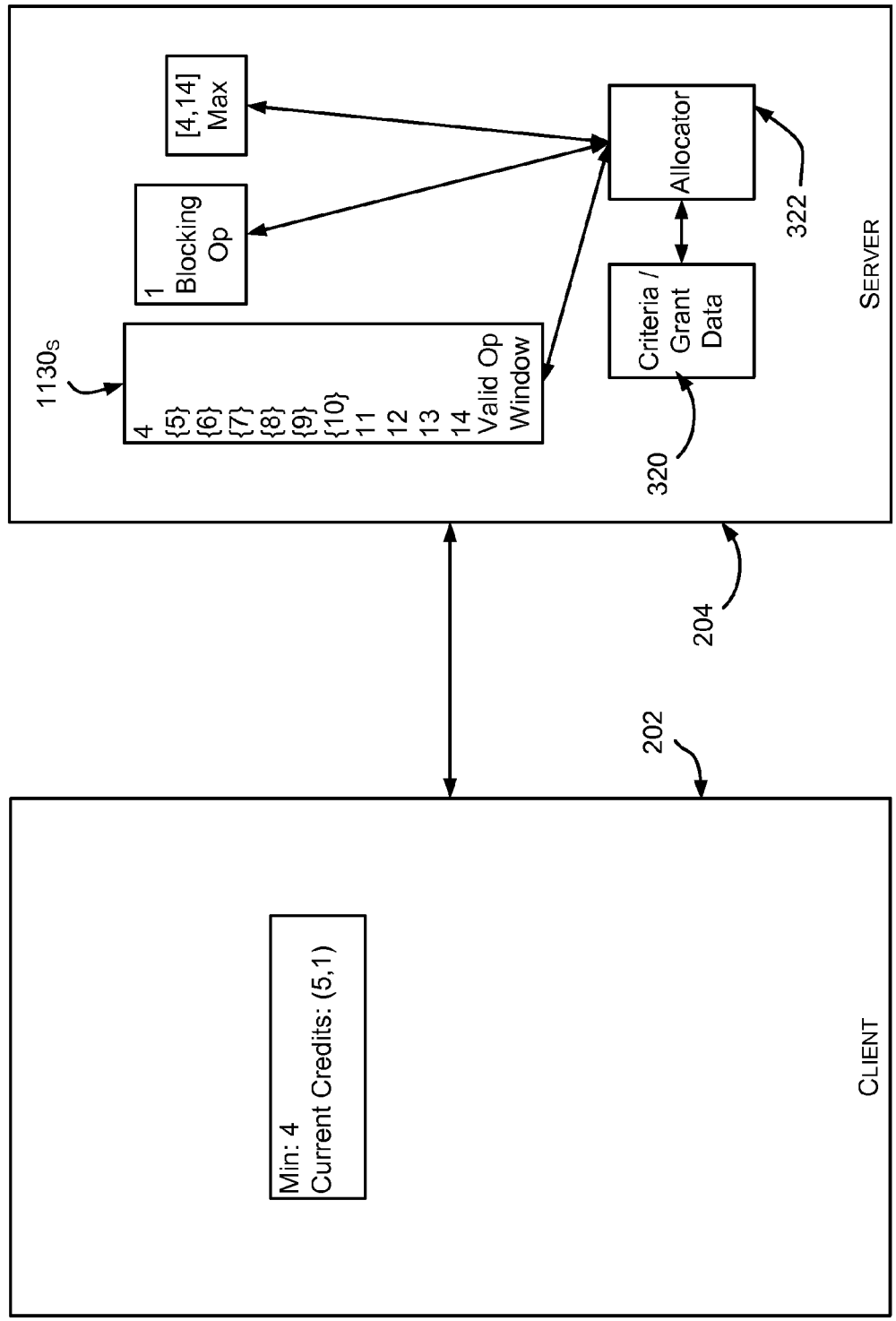
Figure 12:
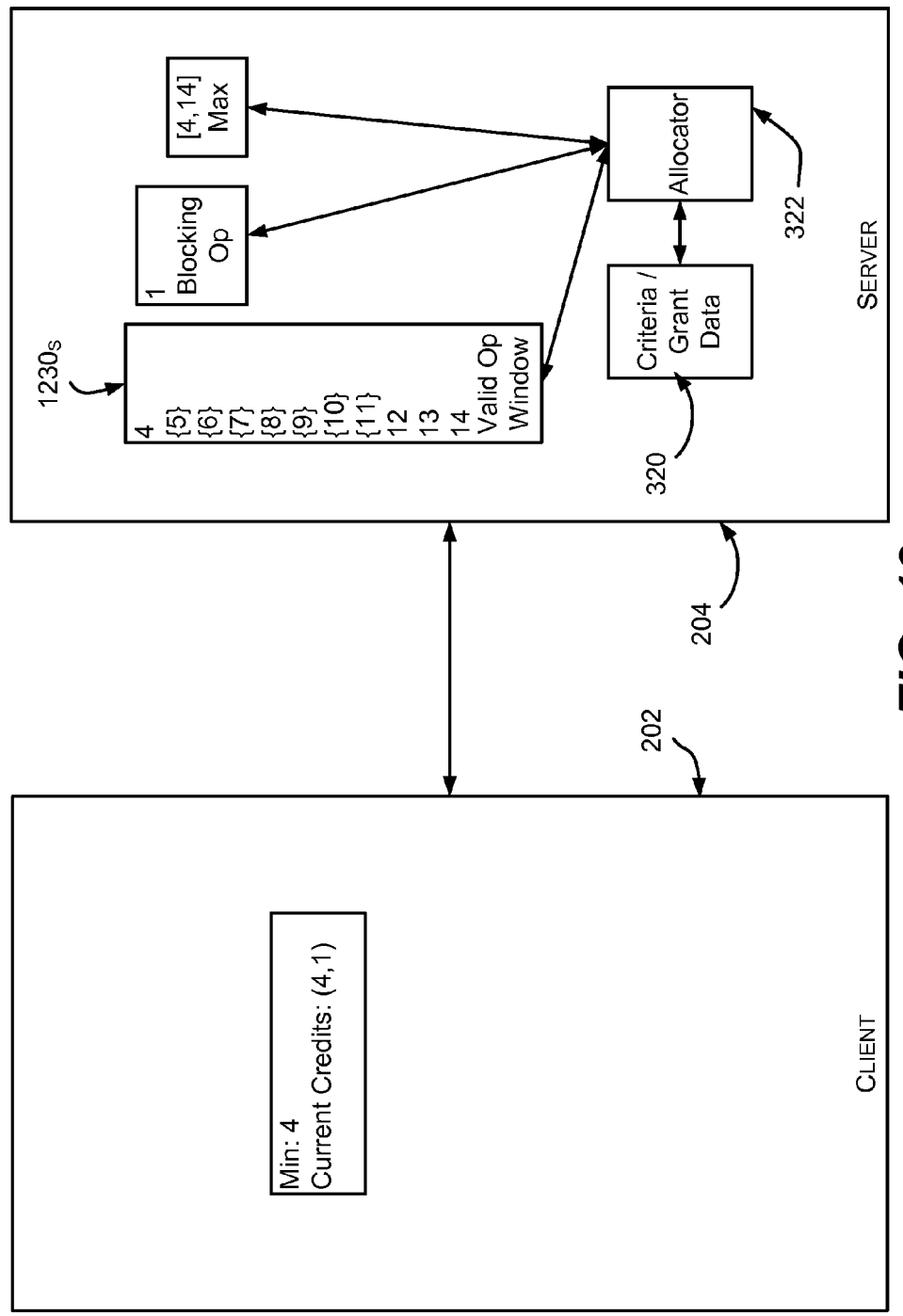

The client sends commands 5,6,7,8,9,10, and the server responds, but without sending command 4. This state is shown in FIG. 11 and in the table below:

| Min: | Current Credits: | Credits: | Valid: [4, 14] | Max: |
|---|---|---|---|---|
| 4 | (5, 1) | (5, 1) | except {5, 6, 7, 8, 9, 10} | [4, 14] |

Note that the client still has five credits because there are still five viable slots in the command window. However, when the client sends, and the server responds, to command 11, the state in FIG. 12 and in the table below exists:

| Min: | Current Credits: | Credits: | Valid: [4, 14] | Max: |
|---|---|---|---|---|
| 4 | (4, 1) | (5, 1) | except {5, 6, 7, 8, 9, 10, 11} | [4, 14] |

Note that the client then continues with 12, 13, 14. The client's available number of credits has been reduced by one for each command because there is not an available slot in the MaxWindow. This will continue for commands 12,13,14:

| Min: | Current Credits: | Credits: | Valid: [4, 14] | Max: |
|---|---|---|---|---|
| 4 | (1, 1) | (5, 1) | except {5, 6, 7, 8, 9, 10, 11, 12, 13, 14} | [4, 14] |

Figure 13:
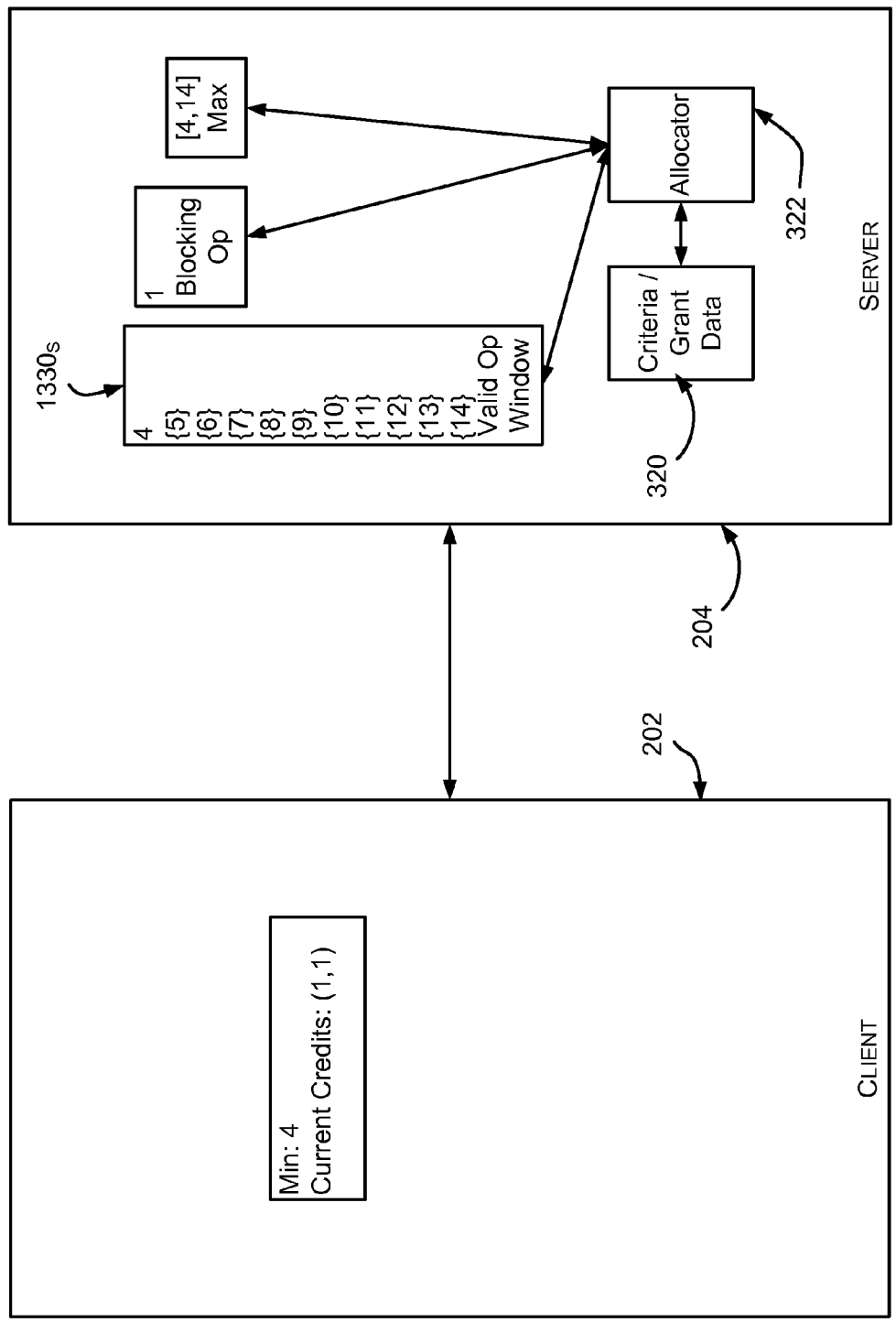

Now the only command the server will accept from the client is command 4, as represented in FIG. 13.

As can be readily appreciated, the attributes of a window of sequence numbers are very advantageous in a number of desirable scenarios. Some of these scenarios include preventing denial-of-service, allowing quality-of-service, providing a common language for the client and server to reference commands that were executed over a given connection, allow for long-running commands and commands with multiple responses from the server, but balance it with controlling how many resources the client can consume, and allowing for continuous use of security signatures.

With respect to preventing denial-of-service, the server may limit the amount of resources a given client connection may consume, until the server has authenticated the client and the client is behaving correctly. For example, by allowing the server to control the resources allocated to a client, when an apparent attack is detected, the server can enter a "panic mode" where it reduces resources available to its clients to a minimum, and grants them back on a trust-basis. The server gives each client a small enough window to allow work to happen, but prevents any single client from overwhelming essentially all of the resources. When the attack is over or reduced, the server can begin re-granting resources to clients that prove trustworthy.

With respect to allowing quality-of-service, the variable window scheme allows the server to scale the amounts of resources allocated to clients based on their identity and/or their behavior. For example, the server may allot more resources to a web server connecting to the file server than to a single user accessing individual documents. As another example, if another server is a database server that is accessing a file server, the file server may weight the number of credits granted higher than that granted to an average user.

Moreover, when controlling quality of service, the allocation of resources to clients may be dynamically altered based on the clients' various needs. This allows the server to grant credits in a completely fair manner, or to take other information into account. An administrator may configure machines on resource priority basis, and this may be utilized and change dynamically as users connect and disconnect.

Sequence numbers also provide a common language for the client and server to reference commands that were executed over a given connection. This assists in the building of various features, including persistent handles. For example, because both the client and the server have agreed on a common language for identifying commands as they are sent and received, that is, the sequence number mechanism, when a disconnect occurs there is a straightforward way upon connection reestablishment for the server and client to determine which commands were received and which were not. Without such a set scheme, it is more difficult to track, particularly when the command identifier is chosen by the client and potentially re-used.

Sequence numbers further allow for continuous use of security signatures, without the extreme performance problems of current models; the sends need not be sequenced, (although the checksum of the whole packet will still need to be calculated, and entire packet received before issuing). With respect to packet signing, replayability is not possible. More particularly, a network protocol that does signing needs to embed an index number into the packet to prevent replayability of the signed packet, otherwise an attacker simply reissues the packet without having to resign it, and the packet remains valid. Other methods include timestamps and the like, however these require some form of synchronization between client and server. If index numbers are used, often the network traffic between the client and the server becomes serialized, because the client must ensure the server receives packet 1 before it sends packet 2.

With a sequence number embedded as the command identifier, and a valid window supported on the server, parallel command sends with sequence numbers in them occur naturally. The server enforces the valid window, so each command can only be issued once, whereby replayability is not a problem, as long as the protocol ensures that the key used for signing is unique for each authenticated connection. Note that if the command identifier rolls over, then replayability could become a problem, and thus sequence numbers on the order of 32 bits or 64 bits are desirable to prevent this, with 64 bits likely more desirable if the re-establishment of broken connections is allowed.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
   establishing, by a server, a valid command window comprising a plurality of sequence numbers between and including a lower limit and an upper limit;
   receiving, at the server, a file system command that consumes at least one server resource, the file system command including an associated sequence number;
   determining whether the associated sequence number is within the valid command window;
   processing the file system command when it is determined that the associated sequence number is within the valid command window;
   granting the client at least one additional credit, wherein the at least one additional credit enables the client to consume at least one additional server resource using a subsequent file system command; and
   when the associated sequence number is equal to the lower limit, increasing both the lower limit and the and the upper limit by an amount equal to the at least one additional credit; and
   when the associated sequence number is greater than the lower limit, increasing the upper limit by an amount equal to the at least one additional credit without increasing the lower limit.

2. The method of claim 1, wherein granting the client the at least one additional credit comprises granting the client the at least one additional credit only when the associated sequence number has not been previously included in another file system command.

3. The method of claim 1, wherein the valid command window has a maximum size.

4. The method of claim 3, wherein the maximum size of the valid command window is defined as the difference between the lower limit and the upper limit, further comprising:
   receiving, at the server, a second file system command that consumes at least one additional server resource, the second file system command including a second associated sequence number;
   and when the second associated sequence number is greater than the lower limit and the maximum size of the valid command window has been reached, not increasing either the lower limit or the upper limit until a separate file system command including an associated sequence number equal to the lower limit is received.

5. The method of claim 1, further comprising:
   granting the client one or more blocking operation credits; and
   allowing a blocking operation to be performed by the server in response to receiving a blocking command sent from the client.

6. The method of claim 5, further comprising:
   returning data indicating the blocking operation's progress; and
   returning an identifier for the blocking operation.

7. The method of claim 1, further comprising revoking at least one credit previously granted to the client if the client is idle for a predetermined amount of time.

8. The method of claim 4, further comprising, after the second file system command including an associated sequence number equal to the lower limit is received, increasing the lower limit.

9. The method of claim 1, wherein increasing both the lower limit and the and the upper limit by an amount equal to the at least one additional credit does not change a maximum size of the valid command window.

10. A system comprising:
   one or more processors; and
   a memory coupled to the one or more processors, the memory for storing instructions which, when executed by the one or more processors, performs a method comprising:
   establishing, by a server, a valid command window comprising a plurality of sequence numbers between and including a lower limit and an upper limit;

receiving, at the server, a file system command that consumes at least one server resource, the file system command including an associated sequence number;
determining whether the associated sequence number is within the valid command window;
processing the file system command when it is determined that the associated sequence number is within the valid command window;
granting the client at least one additional credit, wherein the at least one additional credit enables the client to consume at least one additional server resource using a subsequent file system command; and
when the associated sequence number is equal to the lower limit, increasing both the lower limit and the and the upper limit by an amount equal to the at least one additional credit; and
when the associated sequence number is greater than the lower limit, increasing the upper limit by an amount equal to the at least one additional credit without increasing the lower limit.

11. The system of claim 10, wherein the valid command window has a maximum size.

12. The system of claim 11, wherein the maximum size of the valid command window is defined as the difference between the lower limit and the upper limit, the method further comprising:
receiving, at the server, a second file system command that consumes at least one additional server resource, the second file system command including a second associated sequence number;
and when the second associated sequence number is greater than the lower limit and the maximum size of the valid command window has been reached, not increasing either the lower limit or the upper limit until a separate file system command including an associated sequence number equal to the lower limit is received.

13. The system of claim 10, wherein granting the client the at least one additional credit comprises granting the client the at least one additional credit only when the associated sequence number has not been previously included in another file system command.

14. The system of claim 10, wherein increasing both the lower limit and the and the upper limit by an amount equal to the at least one additional credit does not change a maximum size of the valid command window.

15. The system of claim 12, wherein the method further comprises, after the second file system command including an associated sequence number equal to the lower limit is received, increasing the lower limit.

16. A system comprising:
one or more processors; and
a memory coupled to the one or more processors, the memory for storing instructions which, when executed by the one or more processors, performs a method comprising:
establishing, by a server, a valid command window comprising a plurality of sequence numbers between and including a lower limit and an upper limit;
receiving, at the server, a file system command that consumes at least one server resource, the file system command including an associated sequence number;
determining whether the associated sequence number is within the valid command window;
determining whether the associated sequence number has not been previously included in another file system command;
processing the file system command when it is determined that the associated sequence number is within the valid command window and has not been previously included in another file system command;
granting the client at least one additional credit, wherein the at least one additional credit enables the client to consume at least one additional server resource using a subsequent file system command; and
when the associated sequence number is equal to the lower limit, increasing both the lower limit and the and the upper limit by an amount equal to the at least one additional credit; and
when the associated sequence number is greater than the lower limit, increasing the upper limit by an amount equal to the at least one additional credit without increasing the lower limit.

17. The system of claim 16, wherein the valid command window has a maximum size, and wherein the maximum size of the valid command window is defined as the difference between the upper limit and the lower limit.

18. The system of claim 17, the method further comprising:
receiving, at the server, a second file system command that consumes at least one additional server resource, the second file system command including a second associated sequence number;
and when the second associated sequence number is greater than the lower limit and the maximum size of the valid command window has been reached, not increasing either the lower limit or the upper limit until a separate file system command including an associated sequence number equal to the lower limit is received.

19. The system of claim 16, wherein increasing both the lower limit and the and the upper limit by an amount equal to the at least one additional credit does not change a maximum size of the valid command window.

20. The system of claim 16, the method further comprising: granting the client one or more blocking operation credits; allowing a blocking operation to be performed by the server in response to receiving a blocking command sent from the client; returning data indicating the blocking operation's progress; and returning an identifier for the blocking operation.

* * * * *